US010990593B2

(12) United States Patent
Schneider et al.

(10) Patent No.: US 10,990,593 B2
(45) Date of Patent: Apr. 27, 2021

(54) PROVIDING MATCHING SECURITY BETWEEN DATA STORES IN A DATABASE SYSTEM

(71) Applicant: salesforce.com, inc., San Francisco, CA (US)

(72) Inventors: Donovan Schneider, San Francisco, CA (US); Keith Jones Kelly, Walnut Creek, CA (US); Nicholas Albert Bugajski, Mountain View, CA (US)

(73) Assignee: saleforce.com, inc., San Francisco, CA (US)

( * ) Notice: Subject to any disclaimer, the term of this patent is extended or adjusted under 35 U.S.C. 154(b) by 287 days.

(21) Appl. No.: 15/971,545

(22) Filed: May 4, 2018

(65) Prior Publication Data

US 2019/0340283 A1 Nov. 7, 2019

(51) Int. Cl.

| | |
|---|---|
| ***G06F 16/20*** | (2019.01) |
| ***G06F 16/2453*** | (2019.01) |
| ***G06F 16/25*** | (2019.01) |
| ***G06F 16/22*** | (2019.01) |
| ***G06F 16/242*** | (2019.01) |
| ***G06F 16/9535*** | (2019.01) |

(52) U.S. Cl.

CPC .... *G06F 16/24542* (2019.01); *G06F 16/2228* (2019.01); *G06F 16/2428* (2019.01); *G06F 16/258* (2019.01); *G06F 16/9535* (2019.01)

(58) Field of Classification Search

CPC ........... G06F 16/24542; G06F 16/2428; G06F 16/2228; G06F 16/258; G06F 16/9535

See application file for complete search history.

(56) References Cited

U.S. PATENT DOCUMENTS

| | | | | |
|---|---|---|---|---|
| 10,043,030 | B1 * | 8/2018 | Kruse | G06F 21/6245 |
| 10,523,643 | B1 * | 12/2019 | Davis | H04L 63/06 |
| 2004/0186679 | A1 * | 9/2004 | Ohtani | H04L 43/50 702/122 |
| 2007/0073691 | A1 * | 3/2007 | Conlan | G06F 16/9535 |
| 2007/0273497 | A1 * | 11/2007 | Kuroda | G08B 13/19697 340/506 |
| 2012/0054175 | A1 * | 3/2012 | Barsness | G06F 16/2455 707/719 |

(Continued)

*Primary Examiner* — Tarek Chbouki

(74) *Attorney, Agent, or Firm* — Holland & Hart LLP

(57) ABSTRACT

Methods, systems, and devices for providing matching security between data stores are described. In a database system, an operational data store may store transactional datasets and an analytical data store may store analytics datasets generated based on the transactional datasets. For these analytics datasets to efficiently inherit the security configurations of the transactional datasets, security information may be embedded in datasets retrieved from the operational data store during a data acquisition procedure. This security information may be converted into an embedded multiple-value field for storage in the analytical data store. The analytical data store may receive a query for data in a dataset, and may determine security descriptors associated with the user sending the query. The analytical data store may then filter the data based on comparing these determined security descriptors with the security information in the multiple-value field, and may transmit a query response with the filtered data.

14 Claims, 16 Drawing Sheets

(56) References Cited

U.S. PATENT DOCUMENTS

| | | | | |
|---|---|---|---|---|
| 2015/0121545 | A1* | 4/2015 | Chandrasekaran | G06F 16/245 726/27 |
| 2016/0134660 | A1* | 5/2016 | Ponsini | G06F 8/61 726/1 |
| 2016/0232116 | A1* | 8/2016 | Bone | G06F 13/28 |
| 2016/0337366 | A1* | 11/2016 | Wright | G06F 21/6209 |
| 2017/0251013 | A1* | 8/2017 | Kirti | H04L 63/1408 |
| 2018/0247064 | A1* | 8/2018 | Aronovich | G06F 21/6209 |

* cited by examiner

300

PROVIDING MATCHING SECURITY BETWEEN DATA STORES IN A DATABASE SYSTEM

FIELD OF TECHNOLOGY

The present disclosure relates generally to database systems and data processing, and more specifically to providing matching security between data stores in a database system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may be supported by a number of data stores within a database system. Some of these data stores may contain operational data (e.g., transactional data), which may be generated or uploaded to track times, reference values, or both for data transactions. Other data stores may contain analytical data, which may be generated based on transactional data using one or more predictive functions, operations, or heuristics. Users may query for analytical data from these analytical data stores to aid in making business decisions, projecting future data transactions, etc. In some cases, the operational data may be protected using security configurations, where certain users are not allowed access to specific data objects or data records in the operational data store according to the security configurations. However, in these cases, the analytical data store may fail to enforce the same security configurations for the analytical data, or may introduce a large amount of query processing latency in order to enforce the same security configurations. In some cases, this increased query processing latency may be perceivable to a user querying for analytics data, not allowing for "live" query handling at the analytical data store.

DETAILED DESCRIPTION

Figure 1:
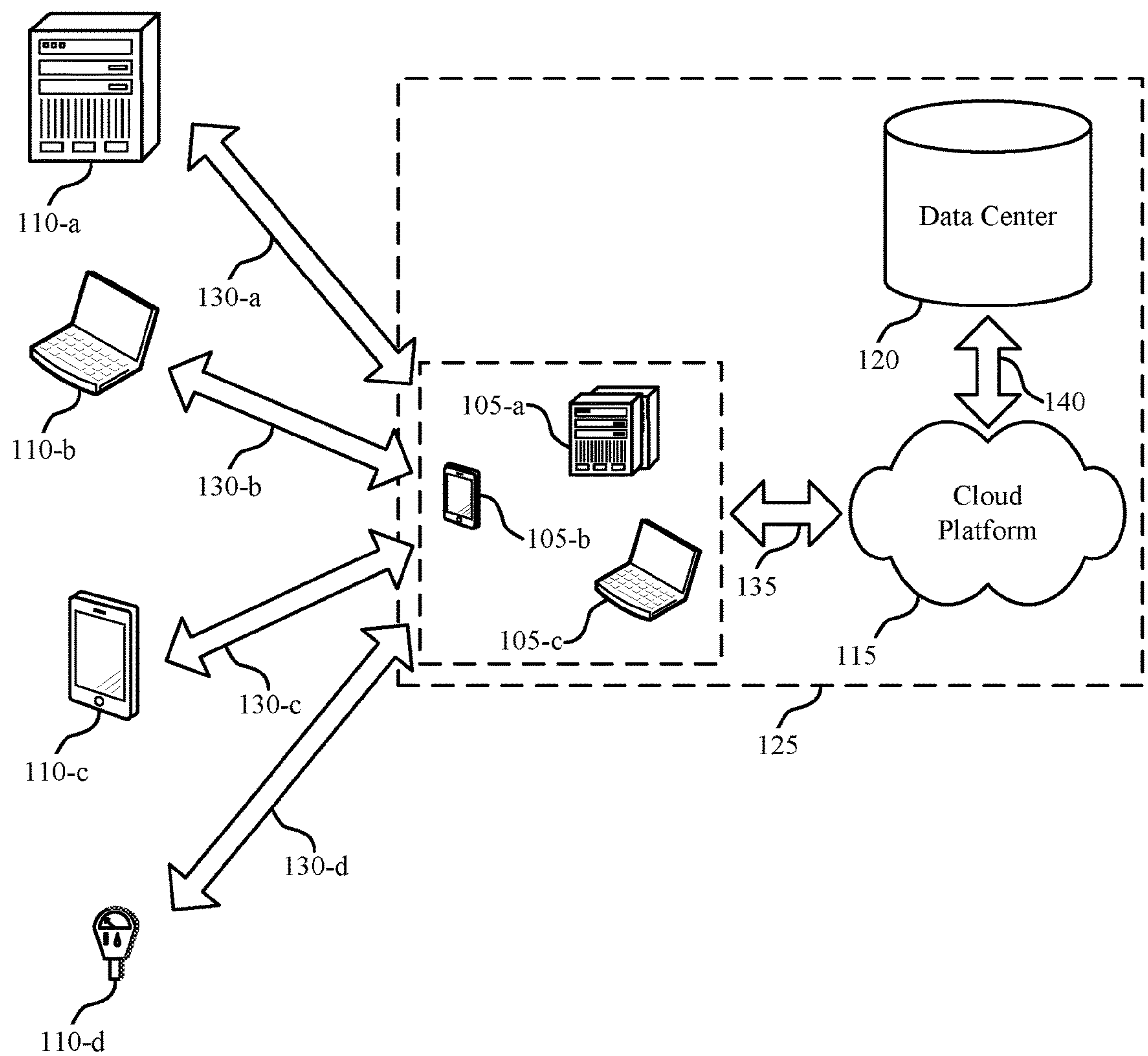
FIG. 1 illustrates an example of a system for cloud computing that supports providing matching security between data stores in a database system in accordance with aspects of the present disclosure.

In some database systems (e.g., multi-tenant database systems), different data stores or databases may store different types of data. For example, an operational data store may store transactional data associated with information related to data transactions, while an analytical data store may store analytics data associated with performing machine learning or predictive functions on transactional data. While these storage systems are described as data stores, they may be examples of data stores, databases, data lakes, or any similar architectures for storing data at rest. In some cases, for an analytical data store to access datasets to perform analytics on, the analytical data store may perform a data acquisition procedure to retrieve data stored elsewhere (e.g., within an operational data store). The analytical data store may then transform the retrieved data or generate analytics datasets using the retrieved data and any number of machine learning techniques, data heuristics, predictive functions, etc. Users may query for information from these analytics datasets. However, in some cases, different users may have different security access levels or credentials, and as such should not have access to certain data objects or records stored in the analytical data store.

The security information, including data access or visibility support for certain users or groups of users, may be defined within the operational data store. For example, the operational data store may contain security descriptors indicating user data access on a data object-by-data object basis. These security descriptors may be examples of strings associated with specific data records for user-specific filtering. As these data records are extracted by the analytical data store and utilized to generate analytics datasets, the security information should match between the analytical data store and the operational data store to support accurate security configurations. To provide this accurate security information, the data stores may modify a data acquisition procedure to include retrieving indications of the security descriptors. For example, the analytical data store may transmit a data acquisition request to the operational data store indicating one or more datasets to retrieve, one or more data fields to retrieve, or a combination of the two. The operational data store may receive the data acquisition request, and may identify any security descriptors associated with data objects of the requested datasets. The operational data store may embed this identified security information in an aggregate dataset with the requested data fields, and may transmit the aggregate dataset to the analytical data store in response to the data acquisition request.

For the analytical data store to support storage of and efficient querying for this security information, the operational data store, analytical data store, or a data flow job may transform the security descriptors into a multiple-value field for each of the retrieved data objects. For example, in some cases, the security descriptors may be stored in multiple discrete fields or as complex objects within the operational data store. During the data acquisition procedure, one of the data stores or a data flow node may aggregate or flatten these values to obtain a single multiple-value field for each data object defining the user visibility or accessibility for that data object. This multiple-value field may be embedded within the datasets retrieved and stored at the analytical data store. Additionally, the security information may be inherited by multiple-value fields for any analytics datasets generated based on these retrieved datasets.

When the analytical data store receives a query for data, the analytical dataset may use the security information stored in the multiple-value field to filter results based on user visibility. The analytical data store may first identify a user associated with the query (e.g., a user operating the user device that transmitted the query), and may determine any security descriptors for the user. In one specific example, these security descriptors may include user identifiers (IDs) or group IDs corresponding to data access for the user. The analytical data store may then compare these security descriptors to the security information stored in the multiple-value field for each queried data object. As this security information is stored locally at the analytical data store, retrieving the security information incurs a significantly lower latency penalty than fetching the security information from the operational data store at query processing time. The analytical data store may identify which queried data objects the user has access to based on comparing the values in the multiple-value field with the user-specific security descriptors, and may filter the queried dataset accordingly. The analytical data store may transmit query results in response to the query that include data objects visible to the user and that do not include data objects not visible to the user (e.g., based on the security descriptors). As this security information is extracted from the operational data store during data acquisition, the data access for each user within the analytical data store is accurate according to the security configuration of the operational data store.

Aspects of the disclosure are initially described in the context of a system supporting an on-demand database service. Additional aspects of the disclosure are described with respect to system architectures, data store processes (e.g., including data extraction and query handling), and a process flow. Aspects of the disclosure are further illustrated by and described with reference to apparatus diagrams, system diagrams, and flowcharts that relate to providing matching security between data stores in a database system.

FIG. 1 illustrates an example of a system 100 for cloud computing that supports providing matching security between data stores in a database system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a data center 120 may support separate data stores (e.g., data stores, databases, data lakes, etc.) for different types of data. For example, the data center 120 may include one or more operational data stores storing transactional data and one or more analytical data stores storing analytics data generated based on the transactional data. These data stores may be physically located within a same data center 120, or may be located at different data centers 120 within a same database system (e.g., a multi-tenant database system). In some cases, for an analytical data store to access datasets to perform analytics on, the analytical data store may perform a data acquisition procedure to retrieve data stored at an operational data store. The analytical data store may then generate analytics datasets using the retrieved data and any number of machine learning techniques, data heuristics, predictive functions, etc. To accurately protect this data from unauthorized users, the analytical data store may additionally extract security information for the datasets during the data acquisition procedure.

The security information may be defined within the operational data store. For example, the operational data store may contain security descriptors indicating user data access on a data object-by-data object basis. The analytical data store may transmit a data acquisition request to the operational data store indicating one or more datasets to retrieve, one or more data fields to retrieve, or a combination of the two. The operational data store may receive the data acquisition request, and may identify any security descriptors associated with data objects of the requested datasets. The operational data store may embed this identified security information in an aggregate dataset with the requested data fields, and may transmit the aggregate dataset to the analytical data store in response to the data acquisition request. This data acquisition procedure may occur at a set periodicity (e.g., at a same time each day) or based on a data acquisition trigger (e.g., if the security configuration at the operational data store is modified by a user, such as a cloud client 105).

For the analytical data store to support storage of and efficient querying for this security information, the operational data store or analytical data store may convert the security descriptors into a multiple-value field for each of the retrieved data objects. For example, the security descriptors may be stored in multiple discrete fields or as complex objects within the operational data store. During the data acquisition procedure, one of the data stores may aggregate or flatten these values to obtain a single multiple-value field for each data object defining the user visibility or accessibility for that data object. This multiple-value field may be embedded within the datasets retrieved and stored at the analytical data store. Additionally, the security information may be inherited by multiple-value fields for any analytics datasets generated based on these retrieved datasets.

When the analytical data store receives a query for data, the analytical dataset may use the security information stored in the multiple-value field to filter results based on user visibility. For example, the analytical data store may identify a user associated with the query (e.g., a cloud client 105 or contact 110 transmitting the query), and may determine any security descriptors for the user. These security descriptors may include user IDs or group IDs corresponding to data access for the user. The analytical data store may compare these security descriptors to the security information stored in the multiple-value field for each queried data object. The analytical data store may identify any queried data objects visible to the user based on comparing the values in the multiple-value field with the user-specific security descriptors, and may filter the queried dataset based on this identification. The analytical data store may transmit query results in response to the query that include data objects visible to the user, and do not include data objects not visible to the user (e.g., based on the user-specific security descriptors). In this way, the analytical data store may provide user-specific security for analytics datasets in pseudo-realtime (e.g., with very low query processing latency).

Conventional systems may fail to provide reliable security information to an analytical data store. For example, conventional systems may use simple query predicate algorithms or simple security checks to handle data access at an analytical data store. These solutions may support fast query processing at the analytical data store at the expense of accurate security information. For example, users may be able to access data in the analytical data store that they cannot access in the operational data store, or that is generated based on data they cannot access in the operational data store. Additionally or alternatively, users may not be able to access data in the analytical data store that they should be allowed to access according to their user credentials. These discrepancies between security for the different data stores may be based on the data stores using different security models for the data—one for heightened security, and the other for improved query performance. In other conventional systems, accurate security information may be supported at the expense of query latency. For example, the analytical data store may fetch security information for data objects from the operational data store during query processing, greatly increasing query processing time and restricting the ability of the analytical data store to provide "live" query results. These conventional systems may not scale for massive, multi-tenant database systems, as greater numbers of data records and users supported by the system may result in much greater security complexities and query latencies.

The system 100, in contrast, may provide both accurate security information and fast query processing at an analytical data store. By retrieving security information during data acquisition, and by converting this security information into a data type supported by the analytical data store that can be efficiently retrieved during query processing, the analytical data store may provide accurate security information matching the security configuration of the operational data store without the need to fetch security information from the operational data store at query time. Additionally, in some cases, a change in security information at the operational data store may trigger a data acquisition process, limiting security drift and providing pseudo-realtime adjustments to the security configuration of the analytical data store. By performing the more time consuming operations at data acquisition time, and retrieving security information locally from a multiple-value field at query processing time, the system 100 may provide "live" query results with accurate data filtering. The system 100 may also support fast and efficient deployment of analytics applications within an analytical data store based on automatically inheriting the security for the analytics application from the existing operational data store security configuration during data acquisition phases.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
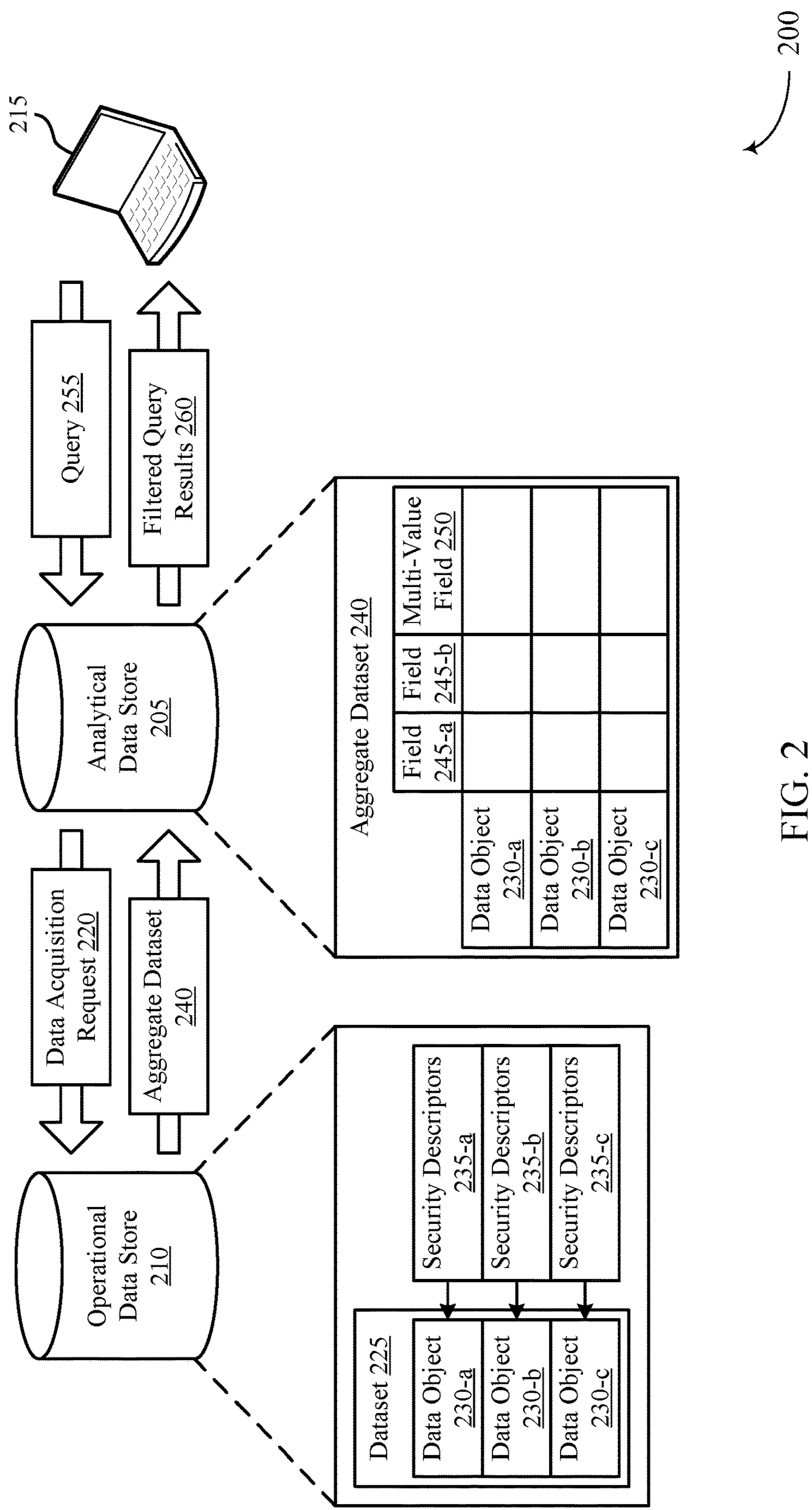
FIG. 2 illustrates an example of a data extraction and query handling process that supports providing matching security between data stores in a database system in accordance with aspects of the present disclosure.

FIG. 2 illustrates an example of a data extraction and query handling process 200 that supports providing matching security between data stores in a database system in accordance with various aspects of the present disclosure. For the data extraction and query handling process 200, the data extraction may involve an analytical data store 205 and an operational data store 210, which may be examples or components of a data center 120 as described with reference to FIG. 1. For example, the analytical data store 205 and operational data store 210 may be separate data stores within a data center 120, or may be separate data stores within different data centers 120. Each of these data stores may be an example of a data store, a database, a data lake, or any combination of these or other similar data storage architectures. The query handling may involve the analytical data store 205 and a user device 215, which may be an example of a cloud client 105, a contact 110, or any other device performing a query for data stored at the analytical data store 205. In some cases, the query handling may additionally involve the operational data store 210.

The analytical data store 205 and the operational data store 210 may store data records in different ways. For example, the operational data store 210 may support a first set of data fields, and may store data utilizing techniques for improved querying performance, improved security, improved storage capacity, or some combination of these or other parameters. The analytical data store 205, on the other hand, may support a second set of data fields (e.g., overlapping with, or distinct from, the first set of data fields), and may store data utilizing techniques for improved analytical performance. For example, the data records may be stored in the analytical data store 205 for simplified or efficient consumption by machine-learning algorithms.

The analytical data store 205 may periodically or aperiodically acquire data from the operational data store 210 for performing analytics. For example, the analytical data store 205 may retrieve one or more datasets from the operational data store 210, and may store these datasets in memory of the analytical data store 205 (e.g., on a hard disk drive (HDD), on a solid-state drive (SSD), in cloud storage, etc.). In some cases, the data may be stored using object storage, file storage, or block storage. The analytical data store 205 may additionally generate new analytics datasets based on the datasets acquired from the operational data store 210. For example, a number of nodes in a data flow process may perform functions or computations on the retrieved datasets in order to output these analytics datasets. These nodes may be referred to as digest transformation nodes, or simply "digest" nodes, and may aggregate datasets from the operational data store 210, convert data field types of datasets from the operational data store 210, perform predictive algorithms on the datasets from the operational data store 210, or perform some combination of these functions in order to produce analytical datasets for storage in the analytical data store 205.

A user operating a user device 215 may query for information stored in the analytical data store 205. For example, the query 255 may request data records from a dataset retrieved from the operational data store 210 or from an analytical dataset generated based on the retrieved dataset. However, in some cases, this data may be confidential or only accessible by a certain type of user within an organization (e.g., where the organization corresponds to a tenant of a multi-tenant database system that contains the two data stores). In one specific example, a user associated with a certain geographic region for a tenant may have access to tenant-specific data records—which may alternatively be referred to as tenant-specific data objects—associated with that geographic region, and may not have access to tenant-specific data records associated with other regions. This accessibility or visibility information may be represented as security information within the operational data store 210. To maintain this security information during the data acquisition process, the operational data store 210 may aggregate security information with a requested dataset, such that the analytical data store 205 extracts an aggregate dataset 240 containing both the requested data fields and one or more additional security fields, which may or may not have been requested.

The analytical data store 205 may transmit a data acquisition request 220 to the operational data store 210 to initiate a data acquisition (e.g., extraction) procedure. The data acquisition request 220 may specify one or more datasets to retrieve from memory (e.g., an HDD, an SSD, in cloud storage, etc.) of the operational data store 205, where each dataset corresponds to a specific data object type. For example, the data acquisition request 220 may indicate to retrieve data records of an opportunity data object type, a case data object type, a contact data object type, a pricing data object type, an account data object type, an order data object type, a custom object data object type, etc. In some cases, the data acquisition request 220 may further specify one or more fields of the data objects to retrieve. For example, rather than retrieving every field for a data object in response to the data acquisition request 220, the operational data store 210 may parse the data objects and retrieve just the requested fields. Furthermore, in some cases, the data acquisition request 220 may specify parameters corresponding to the data objects to retrieve. For example, the data acquisition request 220 may specify a particular tenant, a range of dates or times, or any other values for data fields of the data objects, and the operational data store 210 may retrieve data objects of the requested datasets according to the specified acquisition parameters.

In one example, the data acquisition request 220 may specify to extract dataset 225 from operational data store 210 for analytics processing. The dataset 225 may include a set of data records (e.g., data object 230-*a*, data object 230-*b*, and data object 230-*c*) of a same data object type. Each of these data objects 230 may be associated with (e.g., owned by) a same tenant, or may correspond to different tenants. The operational data store 210 may additionally store security information for these data objects 230. For example, the operational data store 210 may store sets of security descriptors 235 for the dataset 225. These sets of security descriptors 235 may be examples of row-level security information, where each set of security descriptors 235 corresponds to a single data object 230. For example, security descriptors 235-*a* correspond to data object 230-*a*, security descriptors 235-*b* correspond to data object 230-*b*, and security descriptors 235-*c* correspond to data object 230-*c*. These sets of security descriptors 235 may define visibility for the corresponding data objects 230. Each set of security descriptors 235 may include sets of values (e.g., strings) associated with a data object 230. In some cases, these strings may be examples of one or more user IDs, one or more group IDs, or both, where each user or group ID specifies one or more users with access to the corresponding data object 230. In other cases, the security descriptor 235 strings may be examples of other information or indicators related to security for a specific data object 230.

Although the data acquisition request 220 may not request the sets of security descriptors 235 for the data acquisition process, the operational data store 210 may determine to include the security descriptors 235 in the response to the data acquisition request 220. In some cases, the operational data store 210 may automatically identify whether any security descriptors 235 are associated with a requested dataset 225, and may aggregate the security descriptors 235 with the requested data fields 245 for the dataset 225. The resulting dataset may be an example of an aggregate dataset 240. In other cases, the operational data store 210 may first determine whether a security protocol is enabled for the data acquisition. For example, if the security descriptors functionality is enabled (e.g., for a specific tenant, for a specific dataset 225, for a specific analytical data store 205, for any data acquisition procedure, etc.), the operational data store 210 may then determine whether any sets of security descriptors 235 correspond to the requested datasets 225. The operational data store 210 may embed this security information in one or more fields of the aggregate dataset 240. The aggregate dataset 240 may additionally include any data fields 245 for the data objects 230 specified in the data acquisition request 220. The operational data store 210 may transmit this aggregate dataset 240 to the analytical data store 205 in response to the data acquisition request 220.

The fields of the aggregate dataset 240, including appended security information fields, may undergo transformations or conversions between the operational data store 210 and the analytical data store 205. In some cases, the operational data store 210 supports a first set of data field types, and the analytical data store 205 supports a second set of data field types. The second set of data field types may be a subset of the first set of data field types, may overlap with the first set of data field types, or may be distinct from the first set of data field types. To support storage at the analytical data store 205, the fields of the aggregate dataset 240 may be converted to data field types supported at the analytical data store 205. This may involve the conversion of data fields 245, security fields, or both. In some cases, the conversion processes may be performed at the operational data store 210 (e.g., such that the aggregate dataset 240 is pre-packaged for storage at the analytical data store 205). In other cases, the conversion processes may be performed at the analytical data store 210 upon intake of an aggregate dataset 240. In yet other cases, the conversion processes may be performed at data flow nodes within a data flow job that prepares data for storage at an analytical data store 205. In certain examples, further transformations may be performed during the data acquisition procedure. These further transformations may include analytics processing of the aggregate dataset 240, combining multiple datasets, partitioning a dataset into multiple datasets, or any other transformations for determining the datasets to store at the analytical data store 205 upon completion of the data acquisition process. In some cases, these transformations may modify the aggregate dataset 240 transmitted by the operational data store 210. In other cases, the aggregate dataset 240 may remain unchanged, and instead additional datasets may be generated for storage, where these additional datasets are generated based on information in the aggregate dataset 240.

In one example, the data acquisition request 220 may indicate dataset 225 and data fields 245-*a* and 245-*b* of the dataset 225. Accordingly, the operational data store 210 may retrieve the values corresponding to these data fields 245 for the data objects 230-*a*, 230-*b*, and 230-*c* of the indicated dataset 225. Additionally, the operational data store 210 may identify the sets of security descriptors 235-*a*, 235-*b*, and 235-*c* associated with each of these data objects 230, and may retrieve these identified sets of security descriptors 235. In some cases, the operational data store 210 may convert these data fields 245 and security information into supported types, and may embed the converted fields into an aggregate dataset 240 for transmission to the analytical data store 205. In other cases, the operational data store 210 may embed non-converted fields into the aggregate dataset 240, and the analytical data store 205 receiving the aggregate dataset 240 may perform the conversions. The analytical data store 205 may either perform the conversions prior to storing the data, or may store the data and perform the conversions at a later time. In one specific case, the analytical data store 205 may not modify the stored aggregate dataset 240, and may instead generate a new dataset with the converted fields, where the new dataset is used for analytics procedures (e.g., machine learning, natural language processing (NLP), heuristics, etc.) or query handling at the analytical data store 205.

The conversion of the security descriptors 235 may involve determining a multiple-value field 250 for each set of security descriptors 235. For example, the sets of security descriptors 235 may be stored in the operational data store 210 as sets of discrete fields, or as a single field with a complex payload. The values in discrete fields for a set of security descriptors 235 may be aggregated to form a single multiple-value field 250 for storage in the analytical data store 205. The values in a complex payload may be transformed (i.e., flattened) to support storing the multiple-value field 250. In some other cases, the sets of security descriptors 235 may already be stored in a single multiple-value field in the operational data store 210, and may be appended to the aggregate dataset 240 as is without any conversion.

The aggregate dataset 240 and any additional datasets generated based on the aggregate dataset 240 (e.g., using analytics, machine learning, and/or NLP techniques) may be stored at the analytical data store 205 upon completion of the data acquisition procedure. The analytical data store 205 may support "live" query handling for these stored datasets. For example, by retrieving and converting the security information from the operational data store 210 during the data acquisition procedure, the analytical data store 205 may reduce or remove entirely the amount of communications between the analytical data store 205 and the operational data store 210 when processing a query 255. Instead, by accessing the security information in local memory at the analytical data store 205, the latency involved in query processing at the analytical data store 205 may be greatly reduced, while access and visibility security for the data records is maintained.

In one example, a user device 215 may transmit, to the analytical data store 205, a query 255 for data (e.g., a structured query language (SQL) query, or any other type of query). The user device 215 may be operated by a user associated with a specific tenant of the multi-tenant database system, where the user is additionally associated with a specific role or security level within the tenant organization. The query 255 may correspond to the user, for example, based on the user logging into an application or user interface in order to send the query 255. The user may login with a set of user credentials (e.g., a username, password, personal identification number (PIN), biometric input, or some combination of these). The analytical data store 205 may receive the query 255 from the user device 215 and may identify the corresponding user associated with sending the query 255 (e.g., based on the input user credentials).

The analytical data store 205 may determine security information associated with the identified user. In some cases, the analytical data store 205 may store a set of user IDs or group IDs associated with each user. The analytical data store 205 may retrieve these associated user and group IDs for the user, and may generate a query predicate indicating the user and group IDs for the query 255. The analytical data store 205 may then inject this query predicate into the query 255 for processing. In some cases, the security information for each user may further be dataset-specific, and the analytical data store 205 may retrieve security information specific to both the user and the dataset indicated by the query 255. The user operating user device 215 may be associated with a single user ID, and may be associated with any number of group IDs. In some other cases, the operational data store 210 may store the user security information, as opposed to the analytical data store 205. In these cases, the analytical data store 205 may make a call (e.g., an application programming interface (API) call) to the operational data store 210 to retrieve the security information for the user. While this introduces an API call between the analytical data store 205 and the operational data store 210 at query processing time, fetching security access information for a single user (e.g., based on a user account, user profile, role of the user, etc.) may introduce a minimal latency hit (e.g., compared to fetching security information for each data record of a dataset 225).

The analytical data store 205 may then filter the queried data based on the security information for the user and the security information embedded in the multiple-value field 250. For example, the query 255 may query for the values in data field 245-*a* for aggregate dataset 240. Analytical data store 205 may perform row-level filtering based on the injected query predicate. For example, the analytical data store 205 may compare the values in the multiple-value field 250 for each data object 230 in the queried dataset to the user and group IDs in the injected query predicate. The analytical data store 205 may determine whether the user has access to each data object 230—and, correspondingly, the queried values in field 245-*a*—based on comparing the values in the multiple-value field 250 with the generated query predicate.

In a first example, the multiple-value field 250 may contain a set of IDs for users or groups of users with access to each of the data objects 230. In these cases, if the analytical data store 205 identifies a first ID in the multiple-value field 250 for a data object 230 that matches an ID for the user, the analytical data store 205 may halt the ID checking and may grant the query—and, thus, the user—access to that data object 230. If no ID is found to match between the multiple-value field 250 for the data object 230 and the security information for the user, then the user is determined to not have access to the data object 230. Accordingly, the analytical data store 205 may filter this data object 230 out of the queried dataset. In a second example, the multiple-value field 250 may contain a set of IDs corresponding to users that do not have access to each of the data objects 230. In these cases, if the analytical data store 205 identifies a first ID in the multiple-value field 250 for a data object 230 that matches an ID for the user, the analytical data store 205 may halt the ID checking and may filter the data object 230 out of the queried dataset. If no ID is found to match between the multiple-value field 250 for the data object 230 and the security information for the user, then the query 255 is granted access to the data object 230.

In these ways, the analytical data store 205 may filter a subset of the data associated with the aggregate dataset 240 based on the security information for the user and the multiple-value field 250. After checking the security permissions for each data object 230 of the aggregate dataset 240 and applying the corresponding filtering, the analytical data store 205 may transmit filtered query results 260 to the user device 215 in response to the query 255. For example, if the user operating user device 215 has access to data objects 230-*a* and 230-*c*, but does not have access to data object 230-*b*, then the filtered query results 260 may contain the values in data field 245-*a* for both data object 230-*a* and data object 230-*c*. The user device 215 may receive the filtered query results 260 and may, in some cases, display the filtered query results 260 in a user interface.

In this way, security information for data objects 230 stored in the operational data store 210 may be accurately maintained in the analytical data store 205 using a data acquisition process. The analytical data store 205 may use the local security information (e.g., stored in the multiple-value field 250) during query processing to efficiently filter out data that a user associated with sending a query 255 does not have access to. By retrieving this security information locally, rather than hitting the operational data store 210 one or more times to retrieve this security information, the analytical data store 205 may reduce the latency and overhead associated with query processing at the analytical data store 205.

Figure 3:
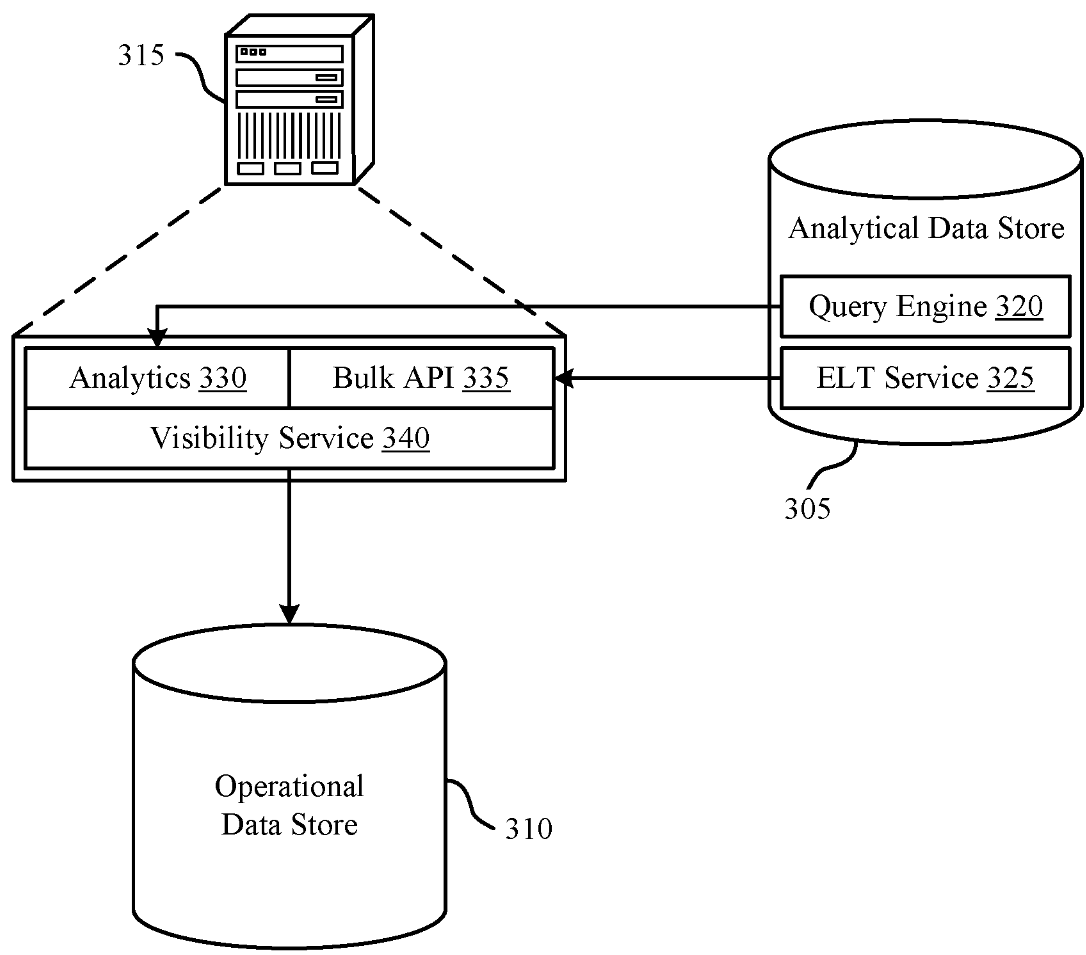
FIG. 3 illustrates an example of a system architecture that supports providing matching security between data stores in a database system in accordance with aspects of the present disclosure.

FIG. 3 illustrates an example of a system architecture 300 that supports providing matching security between data stores in a database system in accordance with various aspects of the present disclosure. The system architecture 300 may include an analytical data store 305 and an operational data store 310, which may be examples of the corresponding data stores described with reference to FIGS. 1 and 2. The system architecture 300 may additionally include a visibility service 340 supporting security descriptors for sharing inheritance. A database server 315 (e.g., implementing core functionality), which may be an example of a single server or a server cluster, may implement an analytics tool 330 and a bulk API tool 335 utilizing the visibility service 340. An extract, load, and transform (ELT) service 325 at the analytical data store 305 may implement the bulk API tool 335 during data extraction, and a query engine 320 at the analytical data store 305 may implement the analytics tool 330 during query processing.

The analytical data store 305 may extract data from the operational data store 310 one dataset at a time (e.g., extracting the data corresponding to a single data object type) using the bulk API tool 335. The bulk API tool 335 may extract data into comma-separated value (CSV) files using a "digest" node within a data flow job. This "digest" node may receive an dataset configured for storage in the operational data store 310 as input, and may output a dataset configured for storage in the analytical data store 305. Internally, the "digest" node may map fields for the input dataset to fields supported by the analytical data store 305. This mapping may allow the query engine 320 at the analytical data store 305 to efficiently query for data from the datasets extracted from the operational data store 310 and stored at the analytical data store 305.

In some database systems, a visibility service 340 may provide sharing inheritance from an operational data store 310 to an analytical data store 305. The visibility service 340 may run on a database server 315 associated with either of the data stores. For example, the visibility service 340 may run on a database server 315 corresponding to the analytical data store 305 when executing a query at the analytical data store 305 (e.g., using the query engine 320). When performing dataset authorization, a data store (e.g., the analytical data store 305) may make a call to the visibility service 340 to determine what data records are visible for the queried dataset and the specific user associated with the query. In some cases, the visibility service 340 may implement a number of techniques to determine the data visibility. The visibility service 340 may identify a data filter based on one or more of the techniques, and may transmit the data filter to the analytical data store 305 for use in query processing. For example, the analytical data store 305 may transform the filter into one or more security predicates for the query. The query engine 320 at the analytical data store 305 may evaluate these security predicates like any other query predicate applied to a dataset.

In a first technique (e.g., a pre-condition strategy), the visibility service 340 may perform a number of simple checks to determine whether the user has access to all of the data in the dataset or none of the data in the dataset. These checks may include determining whether the queried data object or dataset exists, whether the user has access to this dataset at all, whether the dataset or data object type is public data, whether the user has a "View All Data" permission, etc. If the visibility service 340 determines that the dataset does not exist or that the user does not have access to the dataset, the visibility service 340 may transmit an indication to the analytical data store 305 to restrict access to the entire dataset for the querying user. Alternatively, if the visibility service 340 determines that the dataset is a public dataset or that the user has the "View All Data" permission, the visibility service 340 may transmit an indication to the analytical data store 305 to allow access to the entire dataset for the querying user. The filter returned by the visibility service 340 to the analytical data store 305 in the first technique may consist of a Boolean. For example, if a user is determined to not have access to a dataset, the pre-condition strategy may send a value of "false" to the analytical data store 305. The query engine 320 may identify this "false" value, and may correspondingly refrain from transmitting any query results associated with the dataset to the querying user.

In a second technique (e.g., a record ID strategy), the visibility service 340 may determine an amount of data that the querying user has access to. This amount of data may be measured as an estimate or as an exact amount of data, and may be based on the number of data records (e.g., data objects of the specific data object type corresponding to the dataset) that the user can access or view. If the amount of data is below a pre-determined data threshold (e.g., a few hundred or thousand data records) for the dataset, the visibility service 340 may query the operational data store 310 to retrieve a list of all of the data record IDs visible to the querying user. This process may be referred to as sharing inheritance. The visibility service 340 may forward this list of record IDs to the analytical data store 305 for filtering. For example, for the user with access to three data objects in the queried dataset (e.g., three opportunities within the opportunities data object type), the visibility service 340 may transmit the following filter:

'Id' in ["00600000001GMHDMA4", "00600000000zPO0MAM", "00600000001VLSgMAo"]

The analytical data store 305 may transform this filter into a security predicate, and the query engine 320 at the analytical data store 305 may remove any data objects from the dataset that do not have a record ID within the specified set of record IDs. This technique may efficiently and accurately replicate the operational data store 310 security model if the querying user has access to a relatively small number of data records (e.g., less than five thousand). This type of user may be referred to as a low visibility user. If the user has access to many data records (e.g., greater than five thousand), the user may be a medium or high visibility user, and the API call to fetch the security predicates may be too expensive (e.g., computationally, temporally, etc.).

In a third technique (e.g., a security descriptors strategy), the visibility service 340 may support the functionality described above with respect to FIG. 2. For example, the ELT service 325 for the analytical data store 305 may utilize the visibility service 340 (e.g., via the bulk API tool 335) to extract additional security metadata when retrieving datasets from the operational data store 310 during a data acquisition procedure. This security metadata may provide sharing inheritance coverage for users with access to potentially large amounts of data (e.g., amounts of data greater than the pre-determined data threshold of the second technique). The query engine 320 may use this security metadata (e.g., security descriptors stored in multiple-value fields) to filter queried datasets. For example, for a user associated with data access permissions corresponding to a specific user ID and a group ID, the visibility service 340 operating using the security descriptors strategy may transmit the following filter:

'_VisibilityDescriptors' in ["00500000000001J022", "00G0000000000D20a1"]

where the first string corresponds to the user ID and the second string corresponds to the group ID. The "_VisibilityDescriptors" field may contain the retrieved security metadata for each data record within a dataset. The analytical data store 305 may transform the filter into a security predicate, and the query engine 320 may remove any data object form the dataset that does not have either this user ID or this group ID in its set of security metadata stored in the multiple-value field.

The visibility service 340 may perform any number of these techniques according to which techniques are enabled for which datasets. In some cases, the visibility service 340 may perform the first technique, followed by the second technique, followed by the third technique. If at any step the visibility service 340 determines an accurate filter for the dataset, the visibility service 340 may skip the remaining techniques or processes, and may return the determined filter in the form of a visibility filter to the analytical data store 305. The analytical data store 305 may be configured to receive different types of descriptors as filters (e.g., Booleans, strings, lists, etc.) in order to handle responses based on any of the techniques described above. These descriptor filters may be opaque at the analytical data store 305. That is, the visibility service 340 may identify that the security descriptors represent security information (e.g., IDs of users or groups with supported visibility), while the analytical data store 305 may handle the security descriptors simply as sets of strings associated with data records. Each progressive technique may increase the user coverage for the sharing inheritance. In this way, the system architecture 300 may support the analytical data store 305 providing the same row-level security as configured for the operational data store 310 for a large proportion of use cases.

Figure 4:
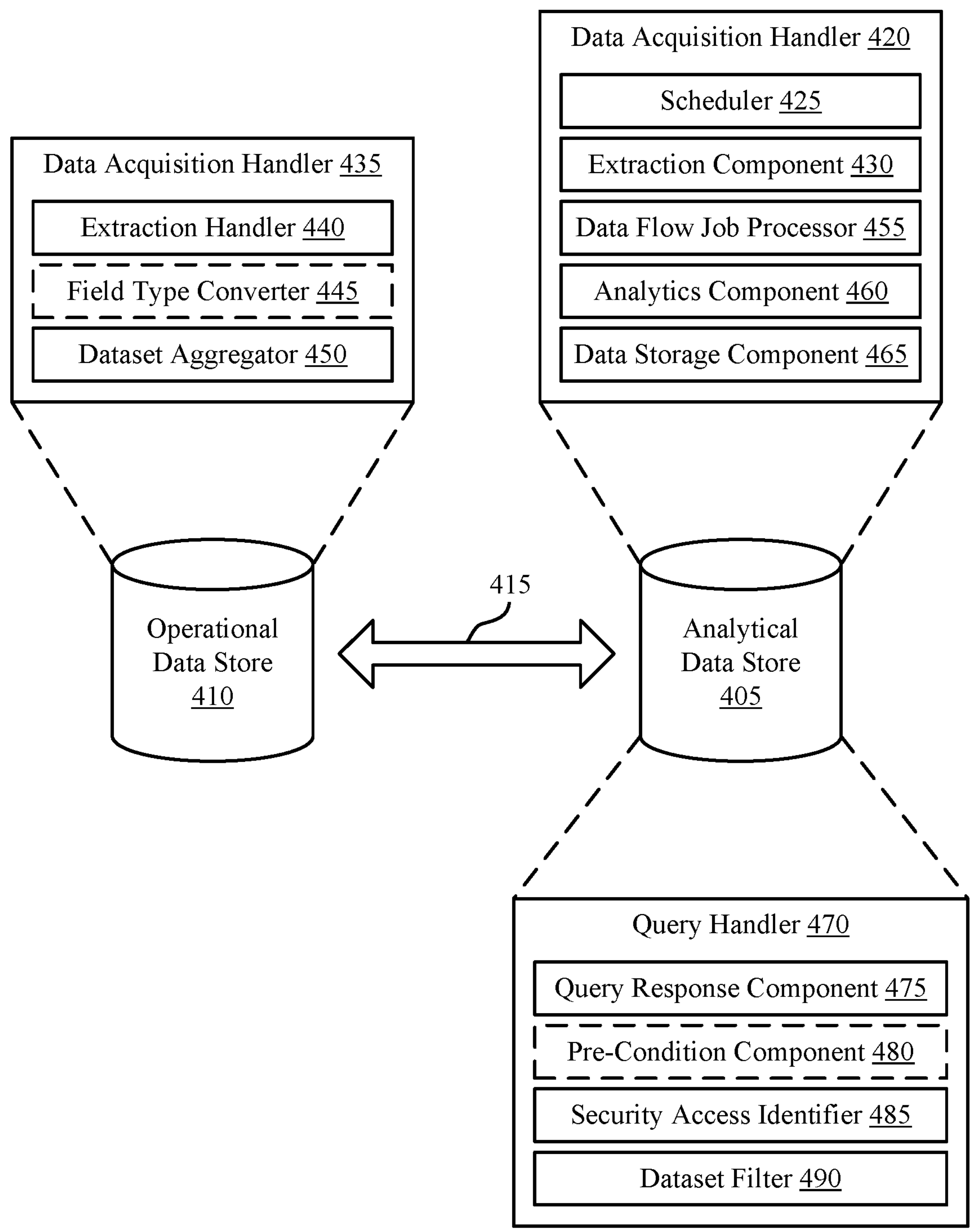
FIG. 4 illustrates an example of data store processes that support providing matching security between data stores in a database system in accordance with aspects of the present disclosure.

FIG. 4 illustrates an example of data store processes 400 that support providing matching security between data stores in a database system in accordance with various aspects of the present disclosure. The data store processes 400 may be performed by a number of components and modules at an analytical data store 405, an operational data store 410, or both, which may be examples of the data stores described with reference to FIGS. 1 through 3. These data stores may be components of a database system (e.g., a multi-tenant database system). The components and modules may be implemented in hardware, software executed by a processor, firmware, or any combination thereof. For example, database servers or application servers associated with the data stores may perform the functionality described below with respect to the different data store components.

In some cases, analytical data stores 405 and the underlying operational data stores 410 may operate using different security models. In some examples, users may define security rules or visibility restrictions at the operational data stores 410 and not the analytical data stores 405, or may define different security rules at the different data stores. However, certain analytics solutions may benefit from implementing matching security rules for the two types of data stores. For example, if an analytics application is deployed to a large number of users (e.g., hundreds or thousands of users) within an organization, the organization may restrict each user to access only analytics data generated based on underlying operational data that the user has access to (e.g., based on geographic regions, the role of each user within the organization, etc.). Simply defining security information in similar ways at both the operational data store 410 and the analytical data store 405 may be complex to develop and may result in inconsistencies between the data stores. Instead, the analytical data store 405 may extract the security information from the underlying operational data store 410 so that the security information may match between the stores. For example, the analytical data store 405 may call an API to extract security information in a compact and expressive manner, and may store this security information for query processing.

In some database systems, an administrative user may enable inheriting row-level security access constraints from the operational data store 410 for each analytical dataset. Additionally or alternatively, the administrative user may modify a data flow for data extraction to indicate inheritance of row-level security access constraints from the operational data store 410. In some cases, this indication may involve annotating a digest transformation node (i.e., a "digest" node) with a record visibility field name for specific data object types (e.g., Opportunity data objects). In other cases, this may involve annotating a register transformation node (i.e., a "register" node) with the record visibility field name.

The analytical data store 405 may include a data acquisition handler 420, which may perform data extraction and transformation functionality on datasets from the operational data store 410. These datasets may be used for analytical processing at the analytical data store 405. The data acquisition handler 420 may include a scheduler 425, an extraction component 430, a data flow job processor 455, an analytics component 460, a data storage component 465, or some combination of these combination components.

The scheduler 425 may determine to perform a data acquisition procedure based on a pre-determined periodicity, a dynamic periodicity, or a triggered data update. The extraction component 430 may transmit a data extraction command to the operational data store 410 over the link 415. This data extraction command may indicate a dataset, a set of data records, a set of data fields corresponding to specific datasets or records, or any combination thereof. A data acquisition handler 435 at the operational data store 410 may receive the data extraction command, and may process the command using an extraction handler 440, a field type converter 445, a dataset aggregator 450, or some combination of these components.

For example, the extraction handler 440 may retrieve from memory the data indicated by the received data extraction command. Additionally, the extraction handler 440 may extract security information (e.g., security metadata) corresponding to this retrieved data. The data extraction command may be modified at the operational data store 440 to include an indication of an attribute list, where the attribute list contains a number of security descriptors representing security or visibility rules. For example, the data extraction command may specify:

SELECT id, opportunity_name, stage FROM opportunity

However, the extraction handler 440 may execute:

SELECT id, opportunity_name, stage, RecordVisibility.AttributeList FROM opportunity The operational data store 410 may respond to this retrieval command for the attribute list with a complex data object. For example, the API may respond with a JavaScript object notation (JSON) object for each data record (e.g., each row of a table storing a dataset in memory). In some cases, the field type converter 445 may convert this complex data object into a data object type supported at the analytical data store 405. For example, the field type converter 445 may traverse the JSON object and flatten it into a multiple-value field. In some cases, the field type converter 445 may additionally convert or transform other data fields during the extraction process (e.g., for improved support at the analytical data store 405). The dataset aggregator 450 may write this field to the retrieved dataset (e.g., as a special "internal only" security field). This "internal only" designation may provide additional security for this security information so that it cannot be queried or accessed from a standard user interface.

The operational data store 410 may transmit the dataset to the analytical data store 405 in response to the data extraction command. Between retrieval at the operational data store 410 and storage at the analytical data store 405, the dataset may be passed through a data flow, containing a number of nodes (e.g., operated by a data flow job processor 455). The data flow nodes may perform multiple transformations on the dataset before ultimately registering or publishing each analytical dataset for storage at the analytical data store 405. The data flow may propagate the security information along with the dataset through all of the transformations (e.g., from the data extract nodes at the beginning of the data flow to the corresponding publish nodes at the end of the data flow). Examples of the transformations performed by the nodes may include augmenting or slicing the datasets or data fields. In some cases, an analytics component may interact with the dataset during the data flow job to produce one or more analytical datasets. For example, one or more nodes in the data flow may perform analytics functions on the data. The data storage component 465 may store the processed datasets and analytical datasets in memory of the analytical data store 405. In some examples, the embedded security fields may be stored in such a way that the security information is not accessible to unauthorized users.

Following this data acquisition procedure by the data acquisition handler 420, the analytical data store 405 may receive one or more queries for data stored at the analytical data store, and may respond to these queries at query runtime. For example, the analytical data store 405 may include a query handler 470 for processing any received queries. The query handler 470 may include a query response component 475 for receiving and identifying the parameters of the query. Additionally, the analytical data store 405 may include a pre-condition component 480 for performing one or more preliminary tests to determine visibility for a specific user or dataset. The pre-condition component 480 may run one or more tests with low overhead and latency to identify whether the query handler 470 can determine query filtering without using the embedded security information.

In some cases (e.g., if the pre-condition component 480 fails to determine a query filter), the query response component 475 may parse the query to determine a list of datasets in the query. A security access identifier 485 may fetch a security profile for each of the identified datasets (e.g., corresponding to a user or user device that initiated the query process). For example, the security access identifier 485 may make an API call to the operational data store 410 to fetch security access information associated with the querying user for the identified datasets.

The dataset filter 490 may form one or more query predicates using the fetched security access information. These security predicates may take the form of:

current_user_security_info IN dataset.security_field, where the security field for the dataset may correspond to the embedded multiple-value field generated during the data extraction procedure. The dataset filter 490 may inject the query predicates into the query, such that the query enforces the row-level security from operational data store 410 when executed in the analytical data store 405. For example, processing the query with the injected query predicate may return query results that include analytics information determined using data visible to the querying user in the operational data store 410, and the dataset filter 490 may filter out any analytics information determined using data protected from the querying user in the operational data store 410.

Figure 5:
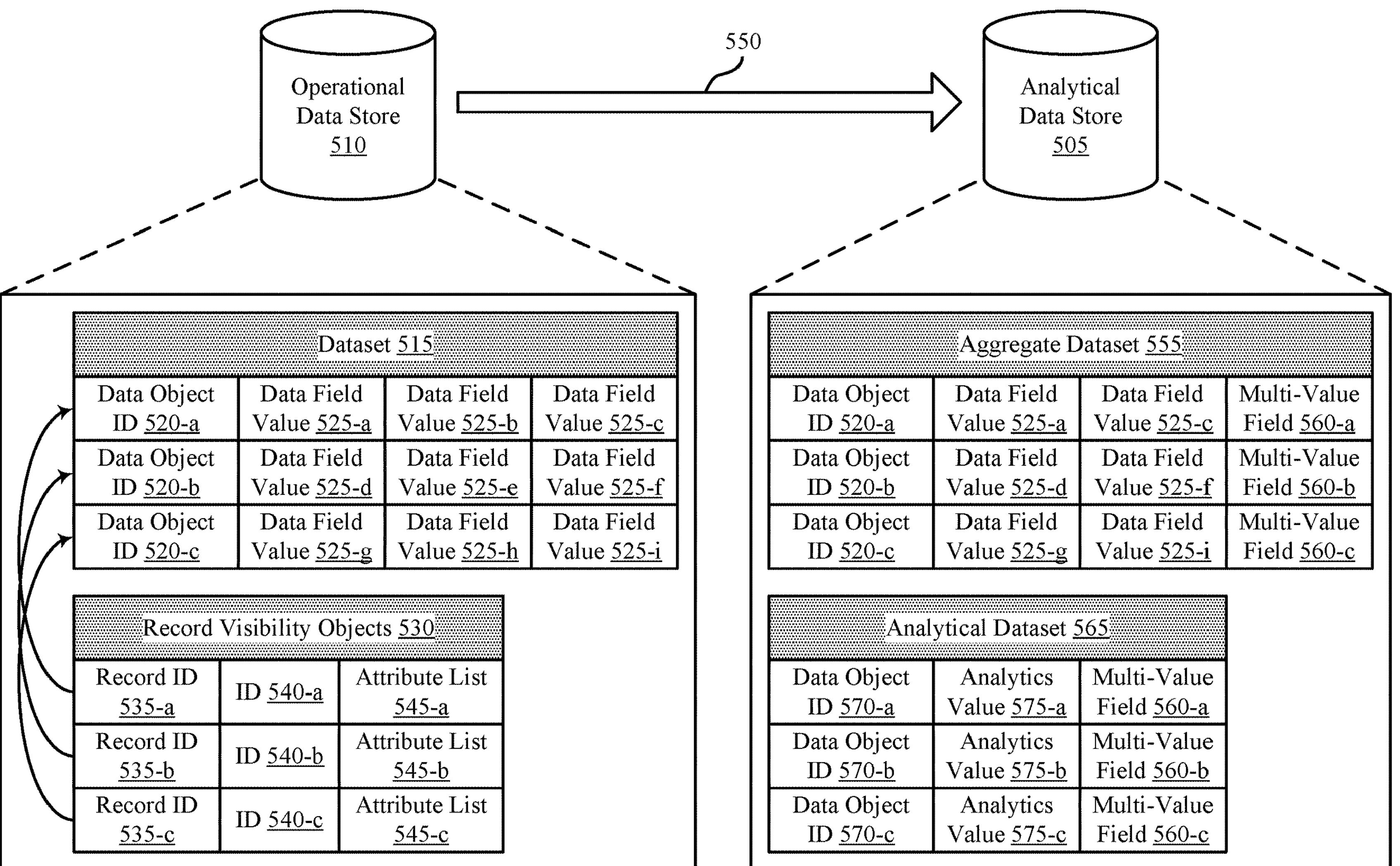
FIG. 5 illustrates an example of a data extraction procedure that supports providing matching security between data stores in a database system in accordance with aspects of the present disclosure.

FIG. 5 illustrates an example of a data extraction procedure 500 that supports providing matching security between data stores in a database system in accordance with various aspects of the present disclosure. In some cases, the data extraction procedure 500 may be referred to as a data acquisition procedure. The data extraction procedure 500 may include an operational data store 510 transmitting an aggregate dataset 555 to an analytical data store 505. These data stores may be examples of the corresponding components described above with reference to FIGS. 1 through 4. The aggregate dataset 555 may be transmitted over a communication link 550, which may be an example of a wired or wireless link between data storage devices or systems. In some cases, this link 550 may include a data flow process or data flow job, where the transferred data is processed by one or more nodes (e.g., servers, computer programs, APIs, etc.).

The data extraction procedure 500 may occur according to a semi-static or dynamic periodicity (e.g., based on when a data flow between the operational data store 510 and the analytical data store 505 is run). In some cases, an administrative user associated with the analytical data store 505 may configure the frequency of data extraction procedures 500. In other cases, administrative users for each tenant may configure the data extraction procedure 500 periodicity for their tenant-specific operational data. In one example, the data extraction procedure 500 may be performed at a same starting time each day (e.g., 6:00 a.m.). The operational data store 510 may initiate the data extraction procedure 500 based on receiving a data acquisition request message from the analytical data store 505, or based on the configured scheduling (e.g., without any explicit signaling from the analytical data store 505).

In some cases, the data extraction procedure 500 may perform full refreshes of data at the analytical data store 505. In other cases, the data extraction procedure 500 may perform incremental updates of data from the operational data store 510. For example, the data extraction procedure 500 may identify data records that have recently been updated (e.g., according to a "last modified time" of the data record) and may retrieve the identified data to update the aggregate datasets 555 and/or the analytical datasets 565 at the analytical data store 505. In some cases, a change in visibility for a data record or dataset 515 at the operational data store 510 may trigger a data acquisition update. However, this change in visibility may not update a "last modified time" for the data record (e.g., as the underlying data has not changed), and accordingly a different procedure may be used to identify these types of changes than used to identify the recently modified data records. For example, a visibility change notification service may transmit a platform event for every data record that has a visibility update. This event may occur at a set periodicity (e.g., every fifteen minutes), and may indicate the data object IDs 520 for each data object that has undergone a visibility change. The data extraction procedure 500 may retrieve these indicated data objects based on the visibility change notification.

In some cases, the visibility change notification service may implement a limit on the number of visibility modifications it can track within a certain time frame. A consumer (e.g., at a visibility service or at the analytical data store 505) may receive the platform events and may generate a list of data object IDs 520 to be updated during a next incremental replication process. In some cases, the incremental replication process may additionally or alternatively update data records based on timestamps for the data records.

During the data extraction procedure 500, the operational data store 510 may identify a dataset 515 indicated for extraction by the analytical data store 505. This dataset 515 may include a number of data objects or data records, each containing a number of fields. For example, a first data object of the dataset 515 may include data object ID 520-*a* in an ID field, and data field values 525-*a*, 525-*b*, and 525-*c* in three data fields. In one specific example, if the dataset 515 corresponds to a "Contact" data object type, these three data fields may include a name of the specific Contact, a phone number of the Contact, and a shipping address of the Contact, respectively. The dataset 515 may additionally include second and third data objects or data records, where the second data object contains a data object ID 520-*b* and data field values 525-*d*, 525-*e*, and 525-*f*, and the third data object contains a data object ID 520-*c* and data field values 525-*g*, 525-*h*, and 525-*i*. It is to be understood that the dataset 515 may include any number of data fields and any number of data objects, where each data object in the dataset 515 may or may not contain data field values 525 for each of the data fields. Additionally, while the dataset 515 is illustrated in a table configuration, the dataset 515 may be stored at the operational data store 510 using any number of techniques or storage configurations.

The operational data store 510 may additionally store security metadata for the dataset 515. This security metadata may be referred to as security descriptors, and may be stored or exposed as virtual foreign key calculated objects called Record Visibility objects 530. A virtual foreign key calculated object may be handled by a query using the same techniques or operations as any other type of object stored in the operational data store 510. The record visibility object 530 may include a generated ID (e.g., an ID 540 used to identify each record visibility object 530), a foreign key record ID (e.g., a record ID 535 indicating the data object corresponding to this record visibility object 530), an attribute list 545 containing security information for the indicated data object, or some combination of these values. The attribute lists 545 may be examples of JSON blobs containing information that may be referenced by a visibility service at query time or may be used to keep security information up to date for data objects. The record visibility objects 530 may include one record per data record in a dataset 515 with sharing inheritance support. For example, if the dataset 515 supports security descriptors, then the record visibility objects 530 may include a first record visibility object corresponding to the first data object of dataset 515, a second record visibility object corresponding to the second data object of dataset 515, and a third record visibility object corresponding to the third data object of dataset 515. This correspondence may be indicated by the foreign key record IDs 535. For example, record ID 535-*a* may indicate data object ID 520-*a*, record ID 535-*b* may indicate data object ID 520-*b*, and record ID 535-*c* may indicate data object ID 520-*c* (e.g., where the indication may be based on these ID fields containing matching ID values). The attribute lists 545 may be lists of opaque strings stored for each indicated data object record. The string values may be user IDs or group IDs. Each user of group ID may be defined in a share table entry, and may indicate a set of security descriptors associated with the given ID. The first record visibility object may include foreign key record ID 535-*a*, generated ID 540-*a*, and attribute list 545-*a*, the second record visibility object may include foreign key record ID 535-*b*, generated ID 540-*b*, and attribute list 545-*b*, and the third record visibility object may include foreign key record ID 535-*c*, generated ID 540-*c*, and attribute list 545-*c*.

In some cases, a user device or some other device may query for the attributes in an attribute list 545. For example, the following query may retrieve the data object IDs 520 and associated attribute lists 545 (e.g., from the corresponding record visibility objects 530) for an Opportunity dataset 515:

SELECT Id, RecordVisibility.AttributeList FROM Opportunity

The query results may include Strings corresponding to each data object ID 520 and JSON blobs corresponding to the descriptors (i.e., security descriptors) that can be referenced at query time. The following table illustrates possible values that may represent the query results in response to the above query:

| ID | RecordVisibility.AttributeList |
|---|---|
| 006S30000022xzQIAQ | [{ "arguments": ["005S3000000Dhxc"], "attributeType": "DESCRIPTORS"}] |
| 006S30000022xzRIAQ | [{ "arguments": ["005S3000000Dhxc"], "attributeType": "DESCRIPTORS"]} |
| 006S30000022xzSIAQ | [{ "arguments": ["005S3000000Dhxc"], "attributeType": "DESCRIPTORS"}] |

Sharing inheritance may be set for a dataset 515 as part of a "digest" node within a data flow job (e.g., when extracting data from the operational data store 510 to the analytical data store 505). If security descriptors are enabled for a dataset 515, this security descriptor enablement can also apply to any other datasets inheriting sharing from the dataset 515. The operational data store 510 may implicitly add the security metadata (e.g., the attribute lists 545) needed for sharing inheritance into the data flow. Effectively, the operational data store 510 may add the attribute list 545 field to the digest call, even if this field was not requested as part of the data extraction procedure 500. For example, the following digest call is modified with the attribute list field:

```
"DigestOpportunity": {
    "action": "Digest",
    "parameters": {
        "fields": [
            { "name": "Id" },
            { "name": "Name" },
            { "name": "StageName" },
            { "name": "AccountId" },
            { "name": "CloseDate" },
            { "name": "RecordVisibility.AttributeList" }
        ],
        "object": "Opportunity"
    }
},
```

This additional attribute list field may be carried through the entire data flow job into the final registered dataset (e.g., the aggregate dataset 555). If the data flow includes augment nodes, the attribute lists 545 may pass through the augment nodes without modification. In some case, if the attribute list 545 is lost during the data flow job, the operational data store 510 may repeat the data extraction procedure 500 or may notify an administrative user that the security information is not accurately represented in the analytical data store 505.

In some cases, the security metadata exposed via the record visibility objects 530 may be protected by an organization permission (e.g., a record visibility API-Org), a user permission (e.g., a record visibility API), or both. If these permissions are enabled, a user may not be able to query for the security metadata in the record visibility objects 530 if the user does not have the necessary permissions. In some cases, the organization permission may be enabled when security descriptors are enabled for a dataset 515. In some cases, a user in charge of extracting the data and the security metadata as part of the data flow may be provisioned with the user permission. In certain examples, a user may be denied access to the security metadata if the user does not have the user permission, or if the user does not have a "View All Data" permission.

In some cases, JSON objects (e.g., JSON blobs, such as the attribute lists 545) may not be native data types for the analytical data store 505. For example, a query engine—such as a query engine 320 as described with reference to FIG. 3—running at the analytical data store 505 may not support using JSON objects in security predicates. Accordingly, the operational data store 510 or the analytical data store 505 may convert the security metadata in the attribute lists 545 into a format supported by the query engine. In some cases, the descriptors from the attribute lists 545 may represent a sufficient amount of information to support generating security predicates at query time. The attribute lists 545 may include other metadata of other attribute types. To support efficient query handling at the analytical data store 505, the complex attribute lists 545 may be transformed into multiple-value fields 560 containing the security descriptors (e.g., user or group ID values). This transformation may be referred to as "flattening" the attribute lists 545, and may be performed at either data store, or at some point within the data flow job. For example, given the following attribute list 545:

```
[
    {
        "attributeType": "DESCRITPORS",
        "arguments": [
            "005xx000000001J",
            "005xx000000002J"
        ]
    },
    {
        "attributeType": "DOMAIN",
        "arguments": [
            "01axx0000000023"
        ]
    },
    {
        "attributeType": "DESCRITPORS",
        "arguments": [
            "0s6xx0000000011"
        ]
    }
],
```

the transformed format for the multiple-value field 560 may be:

[005xx000000001J; 005xx000000002J; 0s6xx0000000011].

This list of values may be a data type supported by the query engine at the analytical data store 505. This generated multiple-value field 560 representing the record visibility descriptors may be loaded into the analytical data store 505 (e.g., embedded within an aggregate dataset 555) and queried as any other multi-value dimension.

In some cases, the above described transformation may occur at the analytical data store 505, or at another node in the data flow job following the "digest" node. As the "digest" node outputs a dataset with fields converted for storage in the analytical data store 505, the "digest" node may convert the attribute lists 545 from JSON objects to strings, and then these strings may be used to determine the multiple-value fields 560. However, performing this JSON to string transformation may inefficiently utilize storage resources, computational resources, or both. In other cases, the "digest" node may perform the conversion from the JSON object to the multiple-value field 560. This generated multiple-value field 560 may be associated with a hidden "RecordVisibility.Descriptors" dimension added to the output of the "digest" node. The transformation procedure may be performed if sharing inheritance is enabled, security descriptors are enabled and supported for the dataset 515, the dataset 515 is used as a sharing source for one or more datasets in the scheduled data flow (e.g., analytics datasets 565 are generated based on the dataset 515), or based on some combination of this criteria.

In one example, the operational data store 510 may transmit the dataset 515, along with the corresponding security metadata represented in the attribute lists 545 of the record visibility objects 530, to the analytical data store 505 via a data flow job. In some cases, the operational data store 510 may send a subset of data fields for the dataset 515 according to a data acquisition request. For example, the analytical data store 505 may extract the first and the third data fields from the dataset 515, but not the second data field. A "digest" node of the data flow may convert these data fields into data field types supported by the analytical data store 505. Additionally, the "digest" node may transform the corresponding attribute lists 545 into multiple-value fields 560, and may embed the generated multiple-value fields 560 into an aggregate dataset 555 with the other data fields. For example, the "digest" node may generate multiple-value field 560-*a* based on attribute list 545-*a*, multiple-value field 560-*b* based on attribute list 545-*b*, and multiple-value field 560-*c* based on attribute list 545-*c*.

Additionally, in some cases, the data flow may perform analytics functions on the aggregate dataset 555 to determine one or more analytical datasets 565. The analytical dataset 565 may include data objects created based on the data objects of the aggregate dataset 555. As such, these data objects generated for the analytical dataset 565 may inherit the multiple-value fields 560 from the data objects of the aggregate dataset 555, such that the represented security descriptors pass through the analytics processing. For example, a first analytics data object with data object ID 570-*a* may include one or more analytics values 575 (e.g., analytics value 575-*a*) based on performing machine learning or predictive algorithms on data field values 525-*a*, 525-*c*, or both, and as such this analytics data object may inherit multiple-value field 560-*a* from the first data object in the aggregate dataset 555. Similarly, an analytics data object with data object ID 570-*b* and analytics value 575-*b* may inherit multiple-value field 560-*b*, and an analytics data object with data object ID 570-*c* and analytics value 575-*c* may inherit multiple-value field 560-*c*. In some case, if an analytics data object is generated based on field values for multiple data objects in aggregate dataset 555, the inherited multiple-value field 560 may be inherited from one of the data objects, or may be an aggregate of the multiple-value fields 560 for the multiple data objects.

A query engine at the analytical data store 505, such as a query engine 320, may utilize new query-time predicates based on the security descriptor filter. For example, the query engine may send a request message to a visibility service—such as a visibility service 340—to retrieve descriptor filters for a query (e.g., based on a specific user/query combination). This filter retrieval process may be performed if sharing inheritance and security descriptors are enabled for the queried dataset, if the sharing source of the queried dataset corresponds to a data object type that supports security descriptors functionality (e.g., where aggregate dataset 555 is the sharing source for analytical dataset 565), if a hidden RecordVisibility.Descriptor field exists for the queried dataset, or if some combination of these criteria are met. The query engine may convert the retrieved applicable filters into a security predicate for the query, such as:

'_VisibilityDescriptors' in ["005xx000000001J", "0s6xx0000000011"]

The query engine may compare this security predicate to the list of security descriptors in the multiple-value fields 560 to determine whether the user associated with the query has access to the corresponding data record.

In some cases, the database system may include a limit on the number of security descriptors that can be added to a security predicate. In some cases, this limit may be based on a maximum supported query processing time or on an acceptable proportion of user coverage. For example, the number of supported descriptors may be limited to specific number (e.g., four hundred) to achieve a specific proportion of user coverage (e.g., 93%). In other examples, the limit may be based on increasing the query processing time by less than a certain amount of time (e.g., less than one second). In some cases, these limits may result in a group of users with security information not covered by the security descriptors. In these cases, security information for these "high visibility" users may alternatively be covered by dataset-specific security predicates. Alternatively, queries associated with these "high visibility" users may be aborted or may return no data records due to limiting the security descriptor coverage.

Similarly, the database system may include a limit on the number of security descriptors that may be represented in a single multiple-value field 560 list. The maximum number of values included in the multiple-value field 560 may be based on keeping query processing time below a query processing time threshold (e.g., to meet certain latency thresholds or requirements). The system may support determining processing time for queries implementing security predicates by including an additional flag in the log line for query resources to indicate whether a query operates on datasets with sharing inheritance enabled. A similar flag may be utilized to indicate data flows implementing sharing inheritance, to accurately determine performance metrics for data flows with and without security descriptors. Data records with numbers of security descriptors greater than a pre-determined limit may be marked as over the limit. In some cases, these marked data records may be visible to users with "View All Data" permissions, and may not be visible to other users. In other cases, a separate security predicate may be generated or uploaded to cover visibility for these data records.

In one specific implementation variant to the data extraction procedure 500 described, the security metadata may not be embedded in the aggregate dataset 555 for the data flow processing. Instead, a first data flow job may retrieve, transform, and perform analytics on the dataset 515, while a separate data flow job or a separate set of data flow nodes not used in the first data flow job may retrieve, transform, and digest the security metadata. Once both data flow jobs are complete, the analytical data store 505 may augment the dataset with the security metadata to form the aggregate dataset 555. From an ELT perspective, this allows the data acquisition procedure to separate the data flow nodes for handling the security metadata from the data flow nodes for performing data analytics and transformations. This may reduce the complexity of tracking the security metadata through the data flow process. Additionally, this implementation may support more frequent data updates, and less frequent security metadata updates, as data often changes more frequently than security settings. Security updates may occur in large batches, which may trigger a large scale security metadata update or a full security metadata refresh at the analytical data store 505. In some cases, the analytical data store 505 may transmit two separate data acquisition requests for the data and the corresponding security metadata (e.g., representing the security descriptors). In other cases, the analytical data store 505 may transmit a single data acquisition request, and the operational data store 510 may separate the data flow processing of the security metadata and the dataset 515 into two distinct sets of data flow nodes (e.g., in a same data flow or in different data flows).

Figure 6:
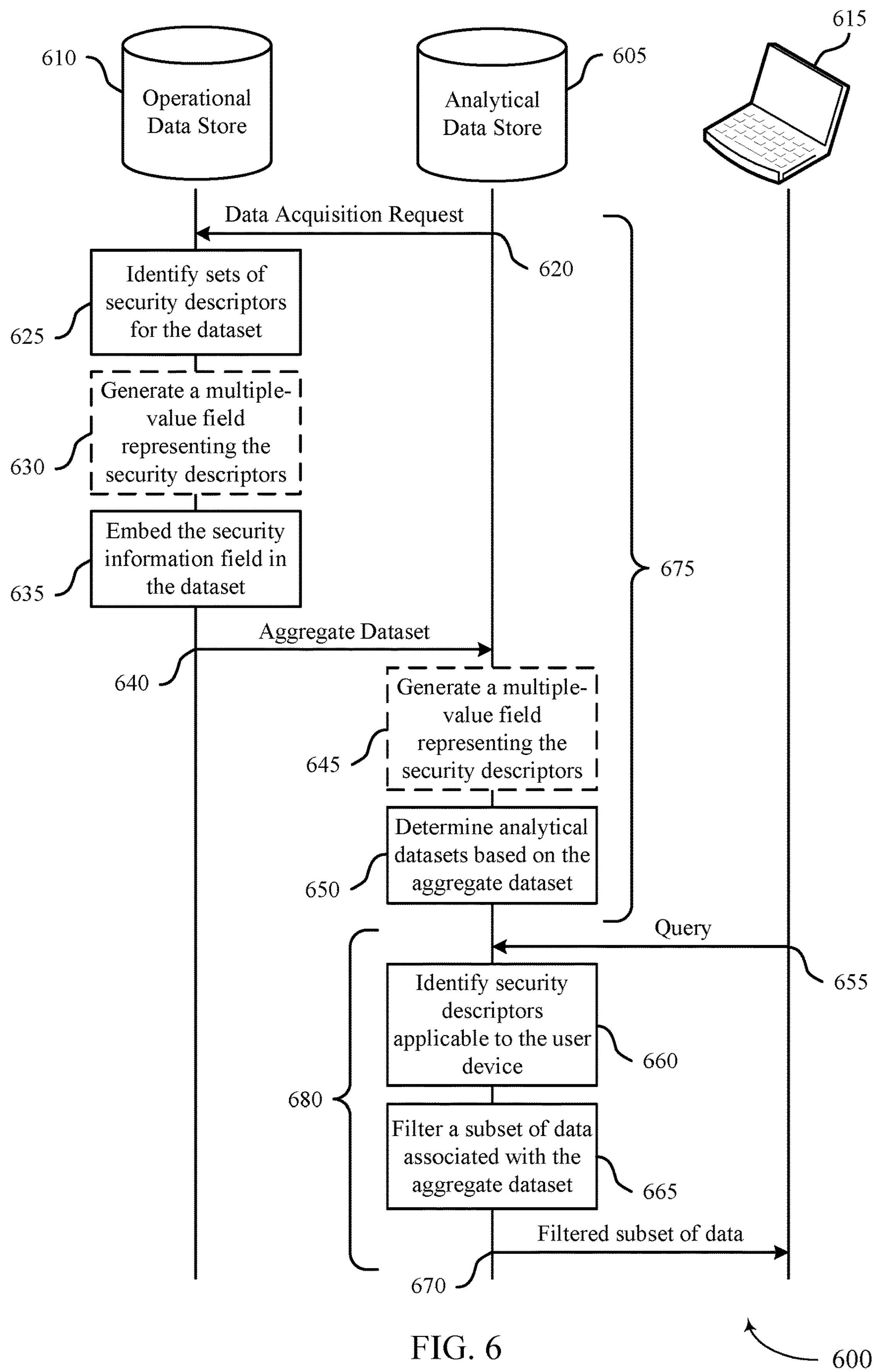
FIG. 6 illustrates an example of a process flow that supports providing matching security between data stores in a database system in accordance with aspects of the present disclosure.

FIG. 6 illustrates an example of a process flow 600 that supports providing matching security between data stores in a database system in accordance with various aspects of the present disclosure. The process flow 600 may include an analytical data store 605, an operational data store 610, and a user device 615. These may be examples of the corresponding devices described with reference to FIGS. 1 through 5. During a data acquisition procedure 675, the operational data store 610 may provide row-level security information to the analytical data store 605. During a query handling procedure 680, the analytical data store 605 may utilize the row-level security information in order to determine data that user device 615 is authorized to view. In some implementations, the processes described below may be performed in a different order, or may include one or more additional or alternative processes performed by the wireless devices.

At 620, the analytical data store 605 may transmit a data acquisition request for one or more fields of a dataset stored at the operational data store 610. This transmission may initiate the data acquisition procedure 675. The data acquisition request message may include an indication of a data object type corresponding to the dataset, one or more field indicators corresponding to the one or more fields of the dataset, an indication of a periodicity for transmitting the data acquisition request, or a combination thereof. In some cases, the analytical data store 605 may transmit the data acquisition request message according to the indicated periodicity, a default periodicity, or both. In other cases, the analytical data store 605 may transmit the data acquisition request based on a data acquisition trigger. For example, the analytical data store 605 may identify a modification to a security parameter of at least one of the one or more fields of the dataset, and may trigger the data acquisition transmission based on the identification. In some cases, this identification may be based on receiving a visibility change notification from the operational data store 610 indicating that a modification occurred at the operational data store 610 to one or more security parameters. The visibility change notification may be received according to a pre-determined periodicity.

At 625, the operational data store 610 may identify a set of security descriptors corresponding to each data object of the dataset indicated in the data acquisition request. These security descriptors may be stored in the operational data store 610 as multiple discrete fields, as a single field containing a complex object (e.g., a single string or blob representing multiple values), or as a single multiple-value field.

At 630, in some cases, the operational data store 610 may generate a multiple-value field representing the identified set of security descriptors corresponding to each data object of the dataset. For example, if the security descriptors are stored in discrete fields, the operational data store 610 may aggregate the fields into a single multiple-value field. If the security descriptors are stored as complex payloads, the operational data store 610 may flatten the information into a multiple-value field. In some cases, the operational data store 610 may perform other field type transformations. For example, the operational data store 610 may convert the one or more fields into fields supported by the analytical data store 605. These field conversions may be performed as part of a bulk extraction process for the dataset (e.g., utilizing data flow node transformations).

At 635, the operational data store 610 may embed the security information with the one or more fields of the dataset into an aggregate dataset. For example, if the operational data store 610 converts the security information into a multiple-value field at 630, the operational data store 610 may embed this field with the other data fields indicated for extraction within a single dataset. At 640, the operational data store 610 may transmit the aggregate dataset to the analytical data store 605 in response to the data acquisition request.

At 645, in some cases, the analytical data store 605 may generate the multiple-value field representing the identified sets of security descriptors. For example, if the operational data store 610 does not perform the transformation process at 630, and instead embeds the security information within the aggregate dataset as multiple discrete fields or a complex payload representing the security descriptors associated with each data object of the aggregate dataset, the analytical data store 605 may perform the conversion to generate a multiple-value field corresponding to this received security information. The analytical data store 605 may store the aggregate dataset with the embedded multiple-value field in memory (e.g., spinning disk memory, an SSD, etc.). In some cases, the analytical data store 605 may additionally create an index on the multiple-value field to support faster access during query processing.

At 650, the analytical data store 605 may perform analytics processing on the retrieved dataset. For example, the analytical data store 605 may determine analytical datasets based on the aggregate dataset and a predictive function, an NLP procedure, a machine learning procedure, or a combination thereof. In some cases, these analytics may be performed as part of a data flow job. The analytical datasets may inherit the security information from the multiple-value field of the dataset they are based on. For example, if a data object of the aggregate dataset is input into an analytics function, the data object output from the function for the analytics dataset may include the same security information in a corresponding multiple-value field as the input data object. If an analytics dataset is generated based on multiple datasets, the analytics dataset may inherit security information from one of the datasets and not the others, or from all of the datasets. In some cases (e.g., in a multi-tenant database system), the analytical data store 605 may support using multiple datasets together in an analytics procedure if each of the datasets are owned by a same tenant. The corresponding output analytics dataset will be associated with that same tenant as well.

In some cases, a user device 615 may query the analytical data store 605 for data associated with the aggregate dataset. For example, at 655, the analytical data store 605 may receive a query from a user device 615 to initiate a query handling procedure 680. The user device 615 may be operated by a user associated with one or more security credentials or data access levels within an organization (e.g., a tenant of the multi-tenant database system).

In some cases, the analytical data store 605 may perform a number of pre-condition test for the query prior to performing security descriptor-based filtering. These pre-condition tests may be based on the user device 615, a user of the user device 615, the aggregate dataset, or some combination of these. The analytical data store 605 may process the query according to the results of the pre-condition tests. For example, the pre-condition tests may include identifying whether the aggregate dataset exists in memory of the analytical data store 605, identifying whether the user of the user device 615 has access to the aggregate dataset, identifying whether the aggregate dataset is a public dataset, identifying whether the user of the user device 615 has a view all data permission, or identifying a combination of these parameters. These identifications may allow the analytical data store 605 to perform binary filtering without using the security descriptors, reducing the latency of the query handling procedure 680. For example, if the analytical data store 605 identifies that user of the user device 615 has a view all data permission, the analytical data store 605 may not perform any further filtering procedures, and instead may grant the query access to all of the data objects within the aggregate dataset (i.e., based on the view all permission). If the analytical data store 605 does not determine a binary filtering (e.g., either granting the query access to all of the data objects in the aggregate dataset or none of the data objects in the aggregate dataset), the analytical data store 605 may proceed to using the security descriptors technique.

The security descriptors technique may involve, at 660, the analytical data store 605 identifying a subset of security descriptors applicable to user IDs or group IDs associated with the user device 615. For example, the user operating the user device 615 may provide user login credentials in order to transmit the query 655. The analytical data store 605 may identify one or more user IDs, one or more group IDs, or a combination of the two associated with the user based on the user credentials. In some cases, the analytical data store 605 may store the user and group ID information in memory. In other cases, the operational data store 610 may store the user and group ID information, and the analytical data store 605 may fetch this information from the operational data store 610. The analytical data store 605 may add the retrieved security descriptors applicable to the user-specific IDs to the query as security predicates.

At 665, the analytical data store 605 may filter a subset of data associated with the aggregate dataset based on the identified subset of security descriptors for the user and the multiple-value field embedded in the aggregate dataset that represents the security descriptors for each data object. The filtering may involve comparing the values in the multiple-value field for each data object of the aggregate dataset to the security predicates (e.g., the identified subset of security descriptors associated with the user) appended to the query. Data objects may be filtered in or out of the query results based on the comparison.

At 670, the analytical data store 605 may complete the query handling procedure 680 by transmitting, to the user device 615, the filtered subset of data in response to the query. In some cases, the user device 615 may receive the filtered subset of data, and may display the filtered subset of data to the user in a user interface. Based on the filtering procedure, the user may view analytics data generated using data objects that the user has access to in the operational data store 610.

In some cases, the query handling procedure 680 may time out. For example, the query handling procedure 680 may be associated with a query response threshold time. The analytical data store 605 may track the time elapsed for the query handling procedure 680, and may halt processing the query if the tracked time for the query processing exceeds the query response threshold time. In some cases, the analytical data store 605 may transmit, to the user device 615 in response to the query, an indication that the time for the query processing exceeded the query response threshold time. This may allow the analytical data store 605 to meet certain query processing latency requirements (e.g., to support "live" query results).

In some cases, the user device 615 may not be able to query for the security information embedded in the aggregate dataset (e.g., within the multiple-value field). For example, the analytical data store 605 may protect the multiple-value field against extraction based on a tenant permission, a user permission, or both. This may add yet another level of security to the database system.

Figure 7:
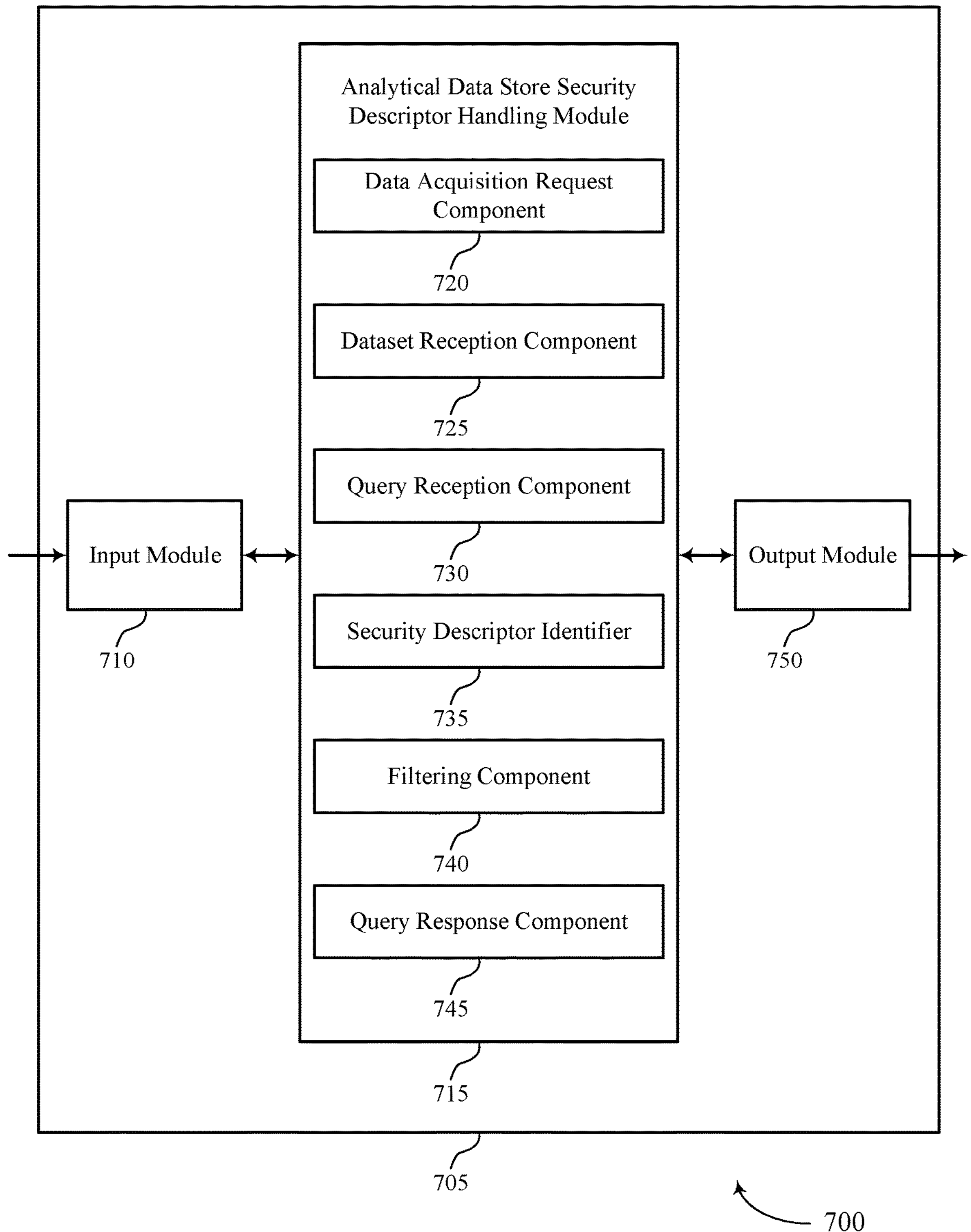
FIG. 7 shows a block diagram of an apparatus that supports providing matching security between data stores in a database system in accordance with aspects of the present disclosure.

FIG. 7 shows a block diagram 700 of an apparatus 705 that supports providing matching security between data stores in a database system in accordance with aspects of the present disclosure. The apparatus 705 may include an input module 710, a security descriptor handling module 715, and an output module 750. The apparatus 705 may also include a processor. Each of these components may be in communication with one another (e.g., via one or more buses). In some cases, the apparatus 705 may be an example of a user terminal, a database server, or a system containing multiple computing devices. For example, the apparatus 705 may be a component or an example of an analytical data store as described with reference to FIGS. 1 through 6.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the security descriptor handling module 715 to support providing matching security between data stores in a database system. In some cases, the input module 710 may be a component of an input/output (I/O) controller 915 as described with reference to FIG. 9.

The security descriptor handling module 715—which may be referred to as an analytical data store security descriptor handling module 715—may include a data acquisition request component 720, a dataset reception component 725, a query reception component 730, a security descriptor identifier 735, a filtering component 740, and a query response component 745. The security descriptor handling module 715 may be an example of aspects of the security descriptor handling module 805 or 910 described with reference to FIGS. 8 and 9.

The security descriptor handling module 715 and/or at least some of its various sub-components may be implemented in hardware, software executed by a processor, firmware, or any combination thereof. If implemented in software executed by a processor, the functions of the security descriptor handling module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The security descriptor handling module 715 and/or at least some of its various sub-components may be physically located at various positions, including being distributed such that portions of functions are implemented at different physical locations by one or more physical devices. In some examples, the security descriptor handling module 715 and/or at least some of its various sub-components may be a separate and distinct component in accordance with various aspects of the present disclosure. In other examples, the security descriptor handling module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data acquisition request component 720 may transmit, to an operational data store, a data acquisition request for one or more fields of a dataset. The dataset reception component 725 may receive, in response to the data acquisition request, an aggregate dataset including the one or more fields and one or more additional security information fields, where the one or more additional security information fields represent security descriptors associated with each data object of the received aggregate dataset.

The query reception component 730 may receive, from a user device, a query for data associated with the aggregate dataset. The security descriptor identifier 735 may identify a subset of security descriptors applicable to a user ID or a group ID associated with the user device. The filtering component 740 may filter a subset of data associated with the aggregate dataset based on the identified subset of security descriptors and a multiple-value field corresponding to the one or more additional security information fields of the aggregate dataset. The query response component 745 may transmit, to the user device, the filtered subset of data in response to the query for data.

The output module 750 may manage output signals for the apparatus 705. For example, the output module 750 may receive signals from other components of the apparatus 705, such as the security descriptor handling module 715, and may transmit these signals to other components or devices. In some specific examples, the output module 750 may transmit output signals for display in a user interface, for storage in a database or data store, for further processing at a server or server cluster, or for any other processes at any number of devices or systems. In some cases, the output module 750 may be a component of an I/O controller 915 as described with reference to FIG. 9.

Figure 8:
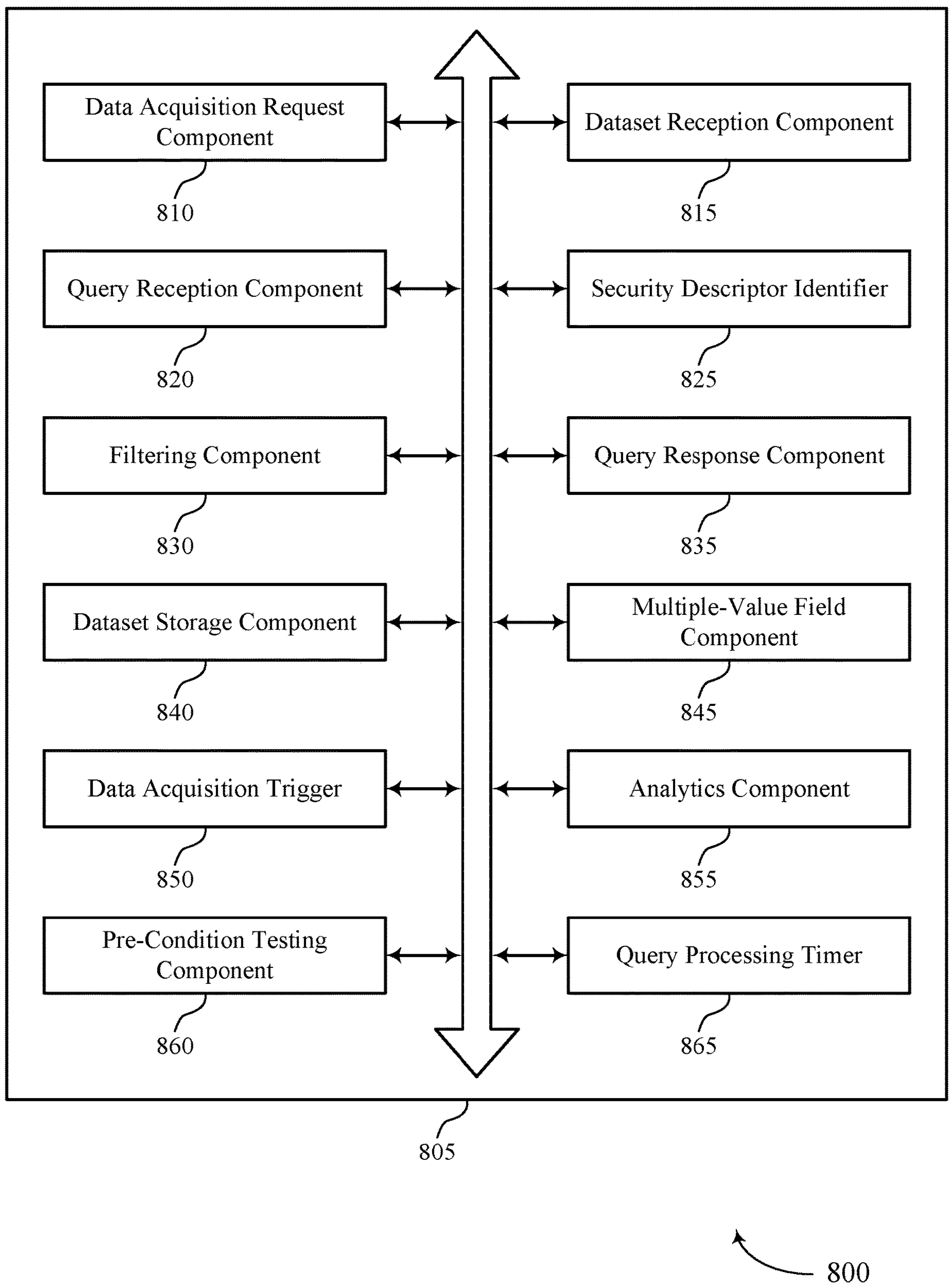
FIG. 8 shows a block diagram of a security descriptor handling module that supports providing matching security between data stores in a database system in accordance with aspects of the present disclosure.

FIG. 8 shows a block diagram 800 of a security descriptor handling module 805 that supports providing matching security between data stores in a database system in accordance with aspects of the present disclosure. The security descriptor handling module 805 may be an example of aspects of a security descriptor handling module 715 or a security descriptor handling module 910 described herein. In some cases, the security descriptor handling module 805 may be a component of an analytical data store within a database system. The security descriptor handling module 805 may include a data acquisition request component 810, a dataset reception component 815, a query reception component 820, a security descriptor identifier 825, a filtering component 830, a query response component 835, a dataset storage component 840, a multiple-value field component 845, a data acquisition trigger 850, an analytics component 855, a pre-condition testing component 860, and a query processing timer 865. Each of these modules may communicate, directly or indirectly, with one another (e.g., via one or more buses).

The data acquisition request component 810 may transmit, to an operational data store (e.g., of the database system), a data acquisition request for one or more fields of a dataset. In some cases, the data acquisition request includes a data object type corresponding to the dataset, one or more field indicators corresponding to the one or more fields of the dataset, an indication of a periodicity for transmitting the data acquisition request, or a combination thereof.

In some cases, the data acquisition request is transmitted according to the indicated periodicity, a default periodicity, or a combination thereof. In other cases, the data acquisition trigger 850 may identify a modification to a security parameter of at least one of the one or more fields of the dataset. In some examples, the data acquisition trigger 850 may trigger the transmission of the data acquisition request based on identifying the modification to the security parameter.

The dataset reception component 815 may receive (e.g., from the operational data store of the database system), in response to the data acquisition request, an aggregate dataset including the one or more fields and one or more additional security information fields, where the one or more additional security information fields represent security descriptors associated with each data object of the received aggregate dataset.

The dataset storage component 840 may store, in memory of the analytical data store, the aggregate dataset. In some cases, the analytics component 855 may determine one or more analytical datasets based on the aggregate dataset and a predictive function, an NLP procedure, a machine learning procedure, or a combination thereof, where each analytical dataset of the one or more analytical datasets inherits security information from the multiple-value field of the aggregate dataset.

The query reception component 820 may receive, from a user device, a query for data associated with the aggregate dataset. In some cases, the pre-condition testing component 860 may perform one or more pre-condition tests for the query based on a user of the user device, the aggregate dataset, or a combination thereof. In some examples, the pre-condition testing component 860 may process the query based on a result of the one or more pre-condition tests. In some cases, the one or more pre-condition tests include identifying whether the aggregate dataset exists in memory of the analytical data store, identifying whether the user of the user device has access to the aggregate dataset, identifying whether the aggregate dataset is a public dataset, identifying whether the user of the user device has a view all data permission, or identifying a combination thereof.

The security descriptor identifier 825 may identify a subset of security descriptors applicable to a user ID or a group ID associated with the user device. In some examples, the security descriptor identifier 825 may retrieve the subset of security descriptors corresponding to a user of the user device and the dataset. In some examples, the security descriptor identifier 825 may add the retrieved subset of security descriptors to the query as security predicates.

The filtering component 830 may filter a subset of data associated with the aggregate dataset based on the identified subset of security descriptors and a multiple-value field corresponding to the one or more additional security information fields of the aggregate dataset. In some examples, the filtering component 830 may compare the subset of security descriptors to values contained in the multiple-value field for each data object of the aggregate dataset, where the filtering is performed at the data object level based on the comparing. In some examples, the filtering component 830 may protect the multiple-value field against extraction based on a tenant permission, a user permission, or a combination thereof. In some examples, the filtering component 830 may generate an index for the multiple-value field of the aggregate dataset, where filtering the subset of data for the query is based on the generated index.

In some cases, the one or more additional security information fields of the received aggregate dataset include the multiple-value field. In other cases, the multiple-value field component 845 may generate the multiple-value field representing the one or more additional security information fields of the aggregate dataset. In some examples, the multiple-value field component 845 may embed the generated multiple-value field with the one or more fields in the aggregate dataset.

The query response component 835 may transmit, to the user device, the filtered subset of data in response to the query for data.

The query processing timer 865 may track a time for query processing, where the query processing includes receiving the query, identifying the subset of security descriptors, filtering the subset of data associated with the aggregate dataset, and transmitting the filtered subset of data. In some examples, the query processing timer 865 may halt the query processing if the time for the query processing exceeds a query response threshold time. In some examples, the query processing timer 865 may transmit, to the user device and in response to the query for data, an indication that the time for the query processing exceeded the query response threshold time.

Figure 9:
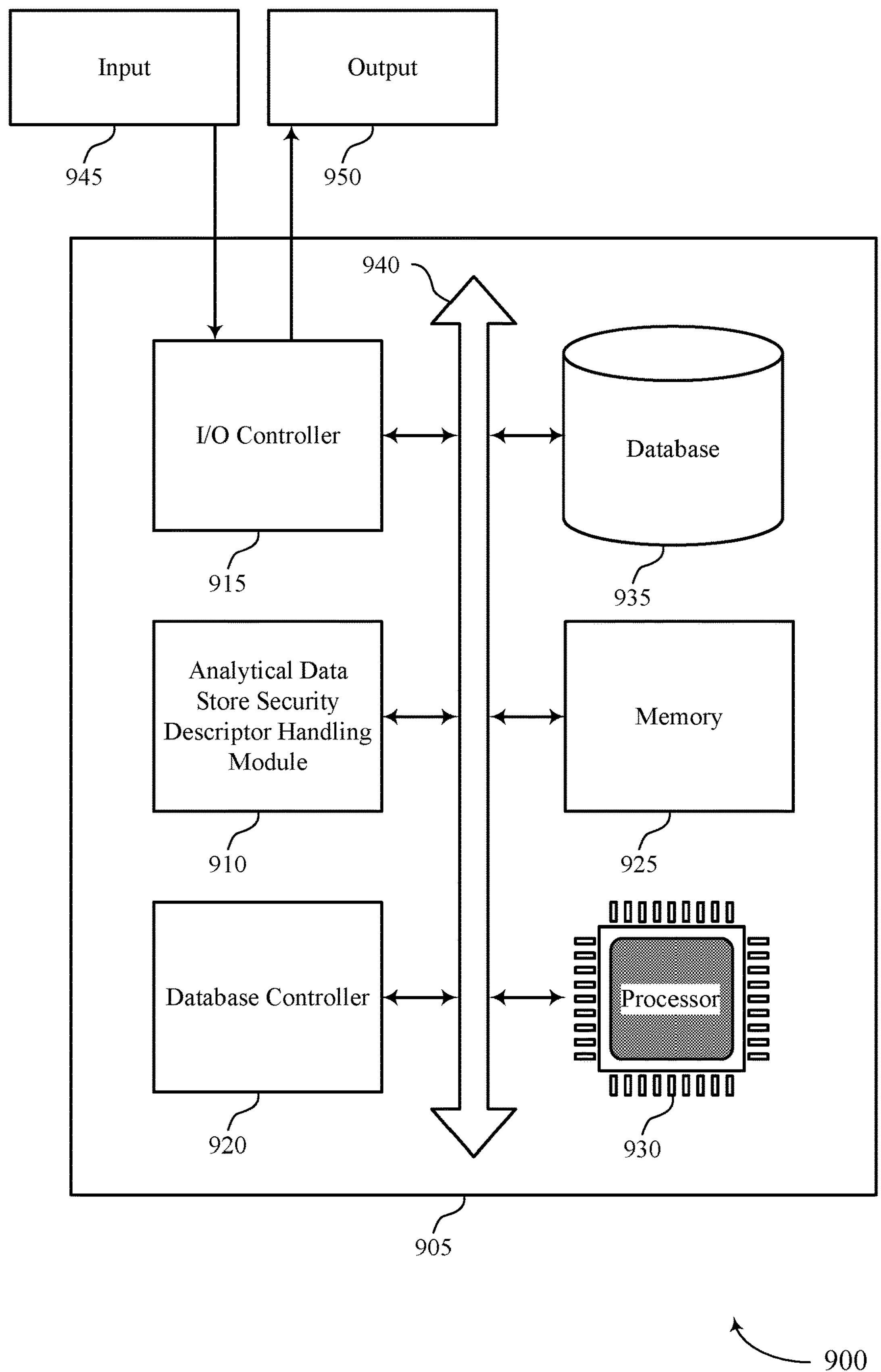
FIG. 9 shows a diagram of a system including a device that supports providing matching security between data stores in a database system in accordance with aspects of the present disclosure.

FIG. 9 shows a diagram of a system 900 including a device 905 that supports providing matching security between data stores in a database system in accordance with aspects of the present disclosure. The device 905 may be an example of or include the components of an analytical data store or an apparatus 705 as described herein. The device 905 may include components for bi-directional data communications including components for transmitting and receiving communications, such as a security descriptor handling module 910, an I/O controller 915, a database controller 920, memory 925, a processor 930, and a database 935. These components may be in electronic communication via one or more buses (e.g., bus 940).

The security descriptor handling module 910 may be an example of a security descriptor handling module 715 or 805 as described herein. For example, the security descriptor handling module 910 may perform any of the methods or processes described above with reference to FIGS. 7 and 8. In some cases, the security descriptor handling module 910 may be implemented in hardware, software executed by a processor, firmware, or any combination thereof.

The I/O controller 915 may manage input signals 945 and output signals 950 for device 905. The I/O controller 915 may also manage peripherals not integrated into device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 930 may be configured to operate a memory array using a memory controller. In other cases, a memory controller may be integrated into processor 930. Processor 930 may be configured to execute computer-readable instructions stored in a memory to perform various functions (e.g., functions or tasks supporting providing matching security between data stores in a database system).

Figure 10:
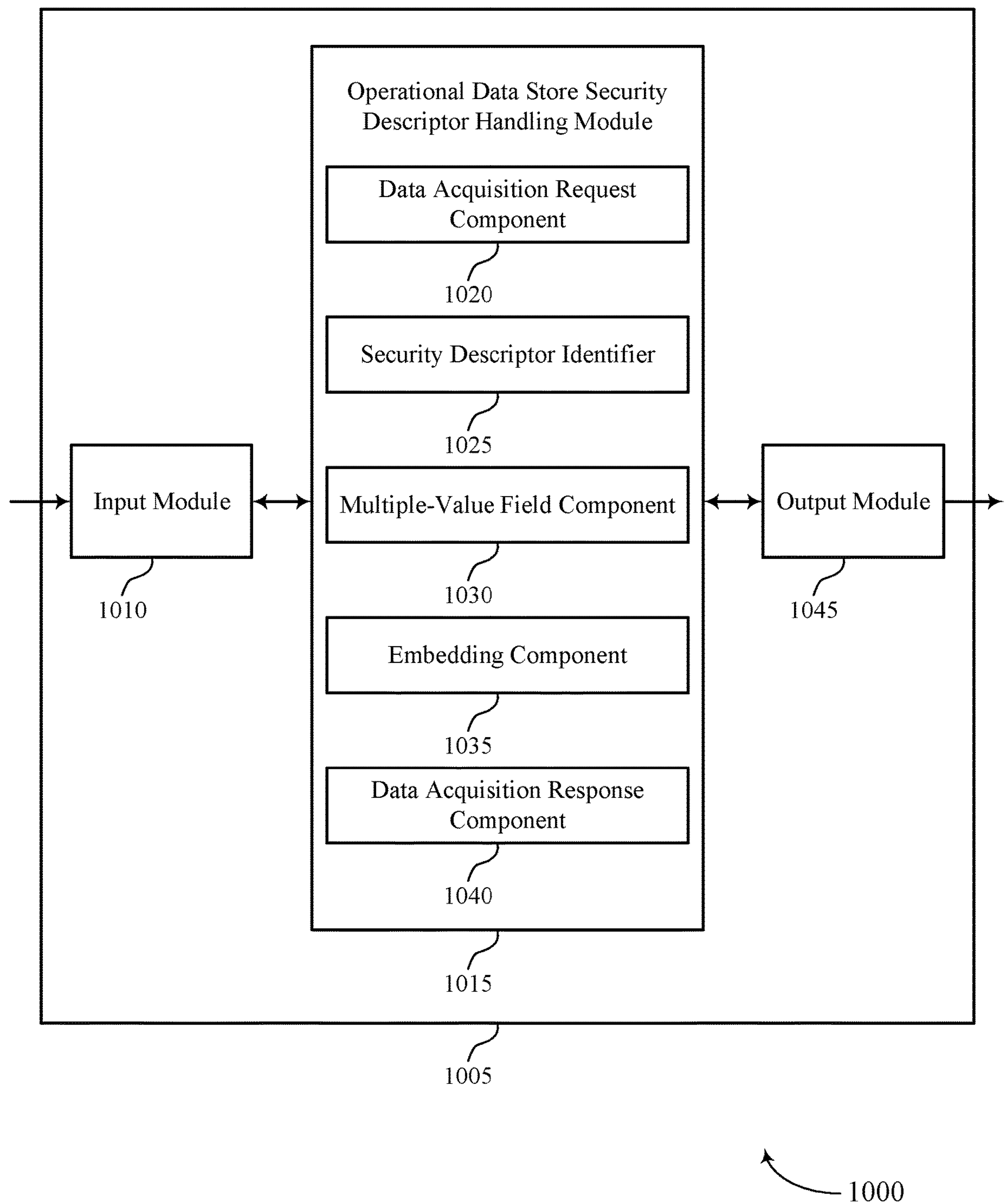
FIG. 10 shows a block diagram of an apparatus that supports providing matching security between data stores in a database system in accordance with aspects of the present disclosure.

FIG. 10 shows a block diagram 1000 of an apparatus 1005 that supports providing matching security between data stores in a database system in accordance with aspects of the present disclosure. The apparatus 1005 may include an input module 1010, a security descriptor handling module 1015, and an output module 1045. The apparatus 1005 may also include a processor. Each of these components may be in communication with one another (e.g., via one or more buses). In some cases, the apparatus 1005 may be an example of a user terminal, a database server, or a system containing multiple computing devices. For example, the apparatus 1005 may be a component or an example of an operational data store as described with reference to FIGS. 1 through 6.

The input module 1010 may manage input signals for the apparatus 1005. For example, the input module 1010 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 1010 may send aspects of these input signals to other components of the apparatus 1005 for processing. For example, the input module 1010 may transmit input signals to the security descriptor handling module 1015 to support providing matching security between data stores in a database system. In some cases, the input module 1010 may be a component of an I/O controller 1215 as described with reference to FIG. 12.

The security descriptor handling module 1015—which may be referred to as an operational data store security descriptor handling module 1015—may include a data acquisition request component 1020, a security descriptor identifier 1025, a multiple-value field component 1030, an embedding component 1035, and a data acquisition response component 1040. The security descriptor handling module 1015 may be an example of aspects of the security descriptor handling module 1105 or 1210 described with reference to FIGS. 11 and 12.

The security descriptor handling module 1015 and/or at least some of its various sub-components may be implemented in hardware, software executed by a processor, firmware, or any combination thereof. If implemented in software executed by a processor, the functions of the security descriptor handling module 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The security descriptor handling module 1015 and/or at least some of its various sub-components may be physically located at various positions, including being distributed such that portions of functions are implemented at different physical locations by one or more physical devices. In some examples, the security descriptor handling module 1015 and/or at least some of its various sub-components may be a separate and distinct component in accordance with various aspects of the present disclosure. In other examples, the security descriptor handling module 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data acquisition request component 1020 may receive, from an analytical data store, a data acquisition request for one or more fields of a dataset stored in memory of an operational data store. The security descriptor identifier 1025 may identify a set of security descriptors corresponding to each data object of the dataset based on the received data acquisition request.

The multiple-value field component 1030 may generate a multiple-value field representing the identified set of security descriptors corresponding to the each data object of the dataset. The embedding component 1035 may embed the generated multiple-value field with the one or more fields in an aggregate dataset. The data acquisition response component 1040 may transmit, to the analytical data store in response to the data acquisition request, the aggregate dataset.

The output module 1045 may manage output signals for the apparatus 1005. For example, the output module 1045 may receive signals from other components of the apparatus 1005, such as the security descriptor handling module 1015, and may transmit these signals to other components or devices. In some specific examples, the output module 1045 may transmit output signals for display in a user interface, for storage in a database or data store, for further processing at a server or server cluster, or for any other processes at any number of devices or systems. In some cases, the output module 1045 may be a component of an I/O controller 1215 as described with reference to FIG. 12.

Figure 11:
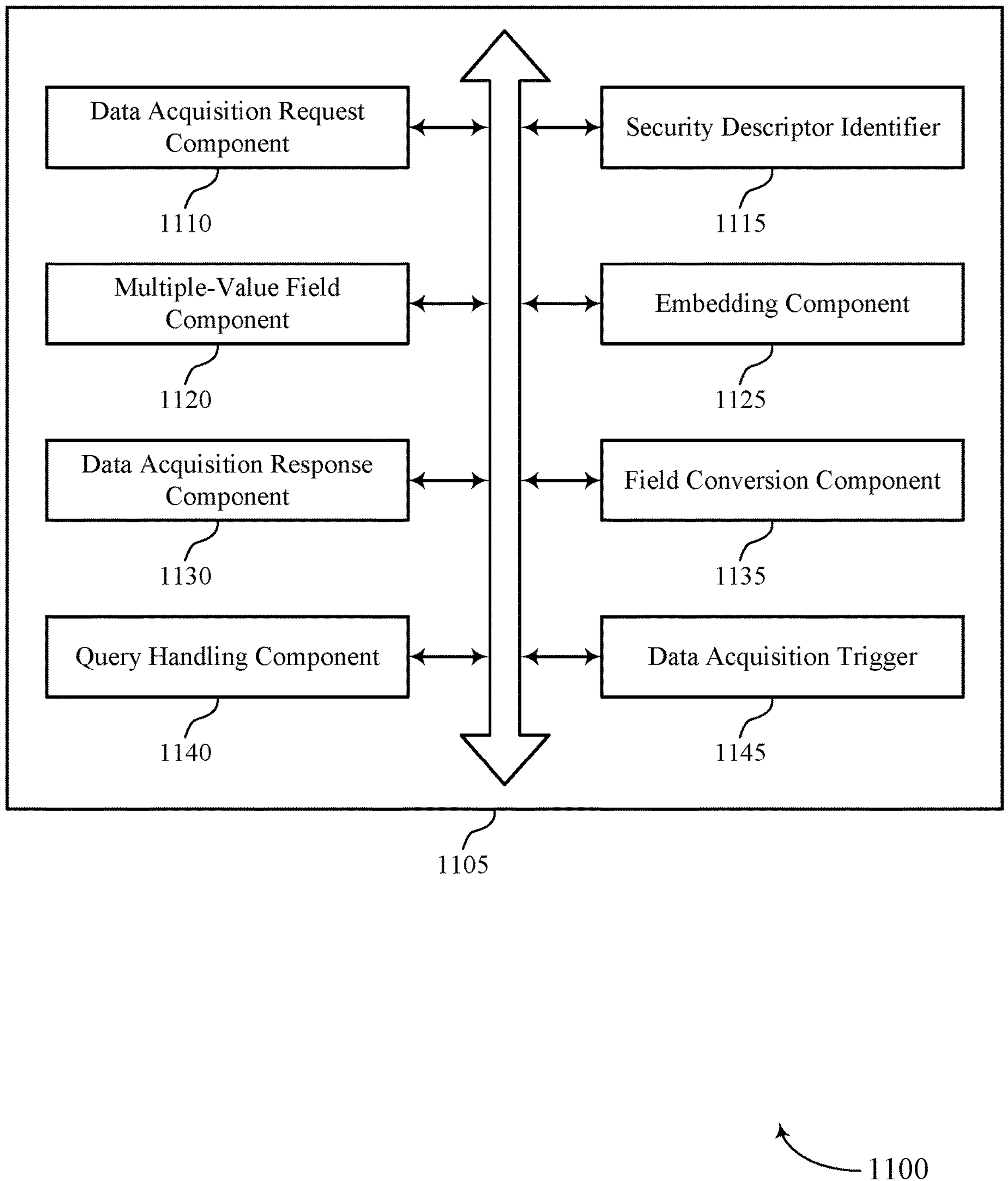
FIG. 11 shows a block diagram of a security descriptor handling module that supports providing matching security between data stores in a database system in accordance with aspects of the present disclosure.

FIG. 11 shows a block diagram 1100 of a security descriptor handling module 1105 that supports providing matching security between data stores in a database system in accordance with aspects of the present disclosure. The security descriptor handling module 1105 may be an example of aspects of a security descriptor handling module 1015 or a security descriptor handling module 1210 described herein. In some cases, the security descriptor handling module 1105 may be a component of an operational data store within a database system. The security descriptor handling module 1105 may include a data acquisition request component 1110, a security descriptor identifier 1115, a multiple-value field component 1120, an embedding component 1125, a data acquisition response component 1130, a field conversion component 1135, a query handling component 1140, and a data acquisition trigger 1145. Each of these modules may communicate, directly or indirectly, with one another (e.g., via one or more buses).

The data acquisition request component 1110 may receive, from an analytical data store, a data acquisition request for one or more fields of a dataset stored in memory of the operational data store. In some cases, the data acquisition request includes a data object type corresponding to the dataset, one or more field indicators corresponding to the one or more fields of the dataset, an indication of a periodicity for transmitting the data acquisition request, or a combination thereof. In some cases, the data acquisition request is received according to the indicated periodicity, a default periodicity, or a combination thereof.

The security descriptor identifier 1115 may identify a set of security descriptors corresponding to each data object of the dataset based on the received data acquisition request. The multiple-value field component 1120 may generate a multiple-value field representing the identified set of security descriptors corresponding to the each data object of the dataset. The embedding component 1125 may embed the generated multiple-value field with the one or more fields in an aggregate dataset.

The data acquisition response component 1130 may transmit, to the analytical data store in response to the data acquisition request, the aggregate dataset.

The field conversion component 1135 may convert the one or more fields in the aggregate dataset into fields supported by the analytical data store, where the converting is part of a bulk extraction process for the dataset.

The query handling component 1140 may receive, from the analytical data store, an indication of a query received at the analytical data store from a user device. In some examples, the query handling component 1140 may transmit, to the analytical data store in response to the indication of the query, a subset of security descriptors applicable to a user ID or a group ID associated with the user device.

The data acquisition trigger 1145 may identify modifications to security parameters of at least one of the one or more fields of the dataset. In some examples, the data acquisition trigger 1145 may periodically transmit, to the analytical data store, a visibility change notification based on identifying the modifications to the security parameters, where the data acquisition request is received based on the visibility change notification.

Figure 12:
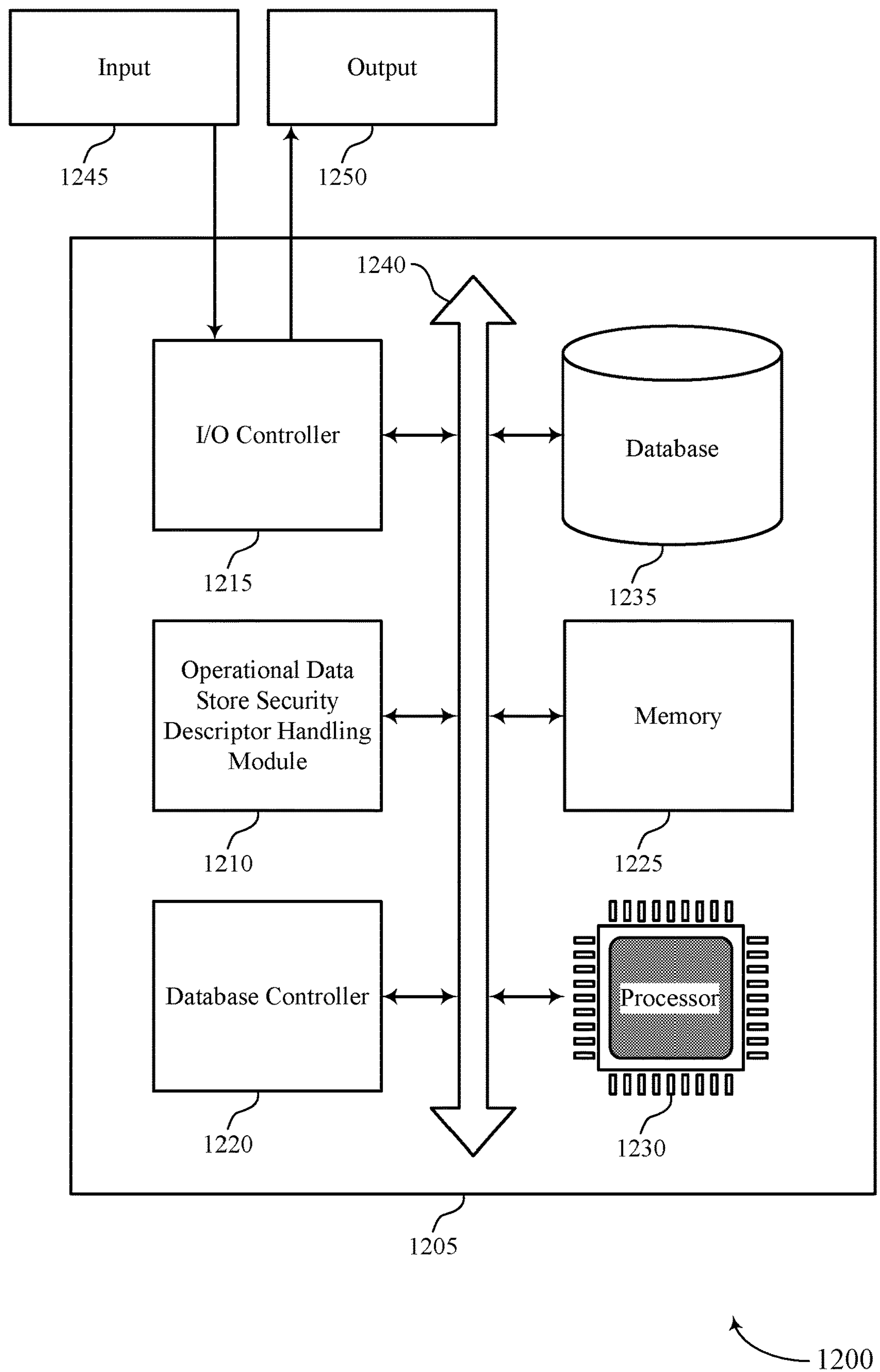
FIG. 12 shows a diagram of a system including a device that supports providing matching security between data stores in a database system in accordance with aspects of the present disclosure.

FIG. 12 shows a diagram of a system 1200 including a device 1205 that supports providing matching security between data stores in a database system in accordance with aspects of the present disclosure. The device 1205 may be an example of or include the components of an operational data store or an apparatus 1005 as described herein. The device 1205 may include components for bi-directional data communications including components for transmitting and receiving communications, including a security descriptor handling module 1210, an I/O controller 1215, a database controller 1220, memory 1225, a processor 1230, and a database 1235. These components may be in electronic communication via one or more buses (e.g., bus 1240).

The security descriptor handling module 1210 may be an example of a security descriptor handling module 1015 or 1105 as described herein. For example, the security descriptor handling module 1210 may perform any of the methods or processes described above with reference to FIGS. 10 and 11. In some cases, the security descriptor handling module 1210 may be implemented in hardware, software executed by a processor, firmware, or any combination thereof.

The I/O controller 1215 may manage input signals 1245 and output signals 1250 for device 1205. The I/O controller 1215 may also manage peripherals not integrated into device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The database controller 1220 may manage data storage and processing in a database 1235. In some cases, a user may interact with the database controller 1220. In other cases, the database controller 1220 may operate automatically without user interaction. The database 1235 may be an example of a single database, a distributed database, multiple distributed databases, a data store, a data lake, or an emergency backup database.

Memory 1225 may include RAM and ROM. The memory 1225 may store computer-readable, computer-executable software including instructions that, when executed, cause the processor to perform various functions described herein. In some cases, the memory 1225 may contain, among other things, a BIOS which may control basic hardware or software operation such as the interaction with peripheral components or devices.

Processor 1230 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1230 may be configured to operate a memory array using a memory controller. In other cases, a memory controller may be integrated into processor 1230. Processor 1230 may be configured to execute computer-readable instructions stored in a memory to perform various functions (e.g., functions or tasks supporting providing matching security between data stores in a database system).

Figure 13:
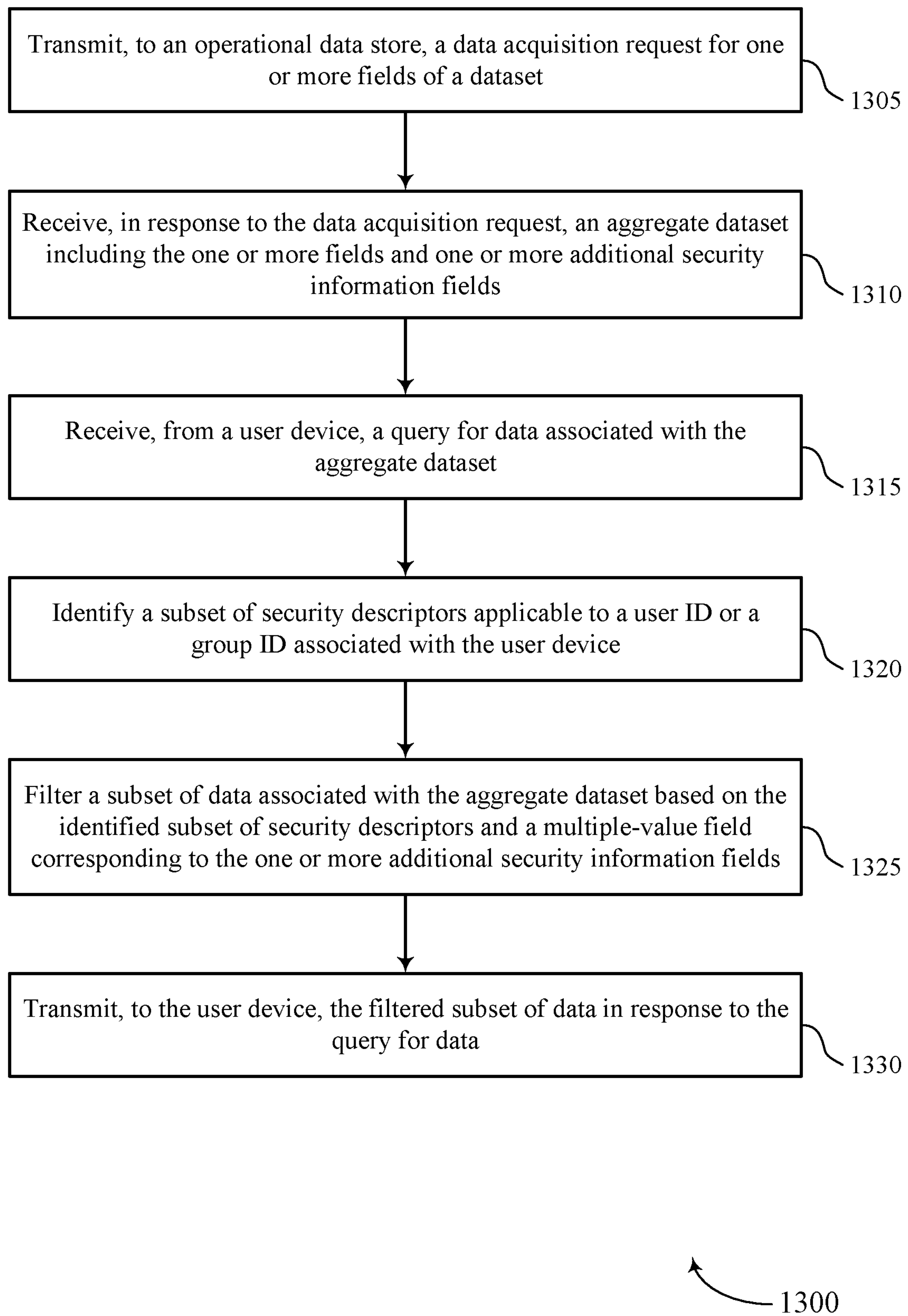
FIGS. 13 through 16 show flowcharts illustrating methods that support providing matching security between data stores in a database system in accordance with aspects of the present disclosure.

FIG. 13 shows a flowchart illustrating a method 1300 that supports providing matching security between data stores in a database system in accordance with aspects of the present disclosure. The operations of method 1300 may be implemented by an analytical data store or its components as described herein. For example, the operations of method 1300 may be performed by a security descriptor handling module as described with reference to FIGS. 7 through 9. In some examples, an analytical data store may execute a set of instructions to control the functional elements of the analytical data store to perform the functions described below.

Additionally or alternatively, the analytical data store may perform aspects of the functions described below using special-purpose hardware.

At 1305, the analytical data store may transmit, to an operational data store, a data acquisition request for one or more fields of a dataset. The operations of 1305 may be performed according to the methods described herein. In some examples, aspects of the operations of 1305 may be performed by a data acquisition request component as described with reference to FIGS. 7 through 9.

At 1310, the analytical data store may receive, in response to the data acquisition request, an aggregate dataset including the one or more fields and one or more additional security information fields, where the one or more additional security information fields represent security descriptors associated with each data object of the received aggregate dataset. The operations of 1310 may be performed according to the methods described herein. In some examples, aspects of the operations of 1310 may be performed by a dataset reception component as described with reference to FIGS. 7 through 9.

At 1315, the analytical data store may receive, from a user device, a query for data associated with the aggregate dataset. The operations of 1315 may be performed according to the methods described herein. In some examples, aspects of the operations of 1315 may be performed by a query reception component as described with reference to FIGS. 7 through 9.

At 1320, the analytical data store may identify a subset of security descriptors applicable to a user ID or a group ID associated with the user device. The operations of 1320 may be performed according to the methods described herein. In some examples, aspects of the operations of 1320 may be performed by a security descriptor identifier as described with reference to FIGS. 7 through 9.

At 1325, the analytical data store may filter a subset of data associated with the aggregate dataset based on the identified subset of security descriptors and a multiple-value field corresponding to the one or more additional security information fields of the aggregate dataset. The operations of 1325 may be performed according to the methods described herein. In some examples, aspects of the operations of 1325 may be performed by a filtering component as described with reference to FIGS. 7 through 9.

At 1330, the analytical data store may transmit, to the user device, the filtered subset of data in response to the query for data. The operations of 1330 may be performed according to the methods described herein. In some examples, aspects of the operations of 1330 may be performed by a query response component as described with reference to FIGS. 7 through 9.

Figure 14:
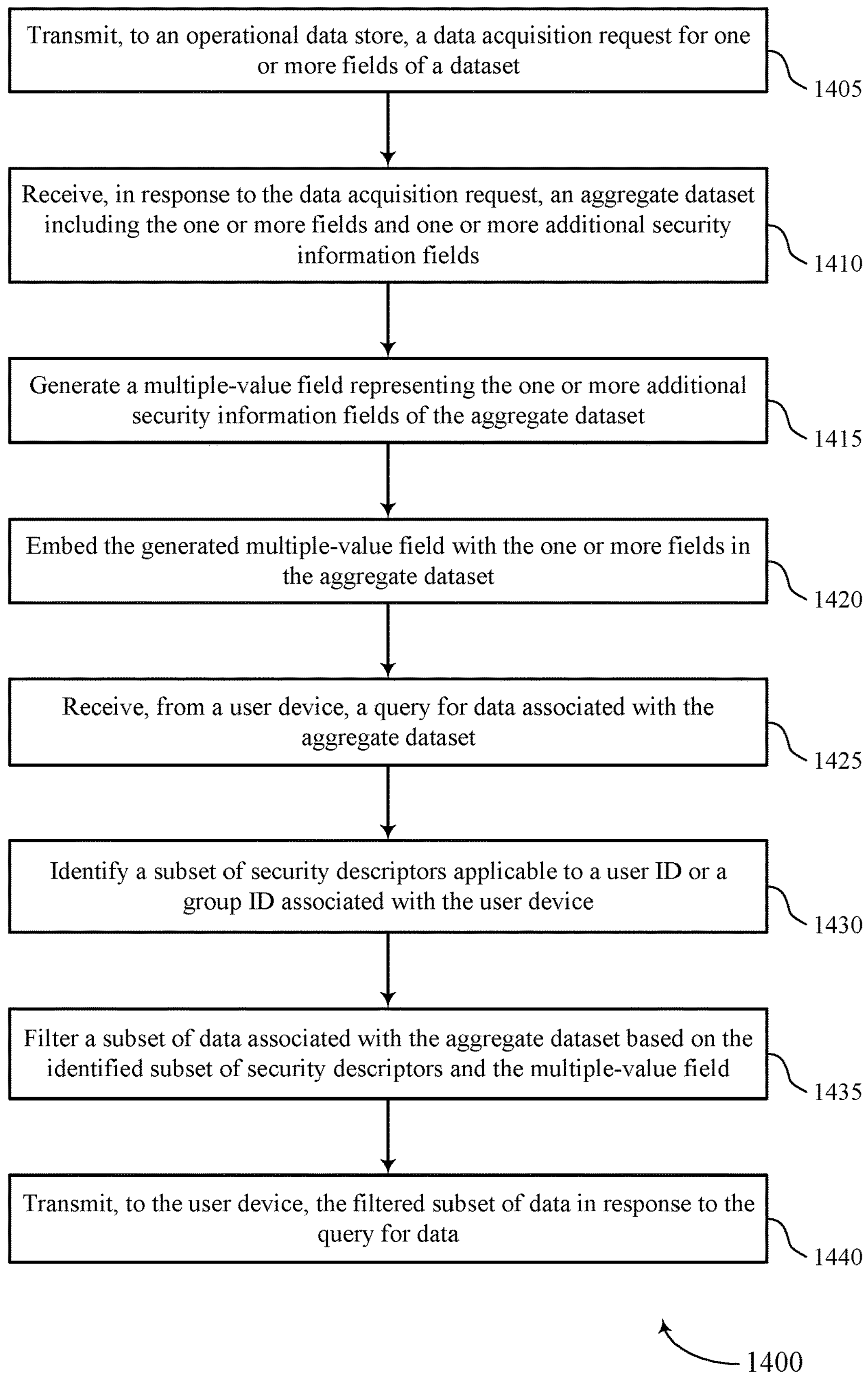

FIG. 14 shows a flowchart illustrating a method 1400 that supports providing matching security between data stores in a database system in accordance with aspects of the present disclosure. The operations of method 1400 may be implemented by an analytical data store or its components as described herein. For example, the operations of method 1400 may be performed by a security descriptor handling module as described with reference to FIGS. 7 through 9. In some examples, an analytical data store may execute a set of instructions to control the functional elements of the analytical data store to perform the functions described below. Additionally or alternatively, the analytical data store may perform aspects of the functions described below using special-purpose hardware.

At 1405, the analytical data store may transmit, to an operational data store, a data acquisition request for one or more fields of a dataset. The dataset may correspond to a specific data object type for data objects stored in the operational data store. The operations of 1405 may be performed according to the methods described herein. In some examples, aspects of the operations of 1405 may be performed by a data acquisition request component as described with reference to FIGS. 7 through 9.

At 1410, the analytical data store may receive, in response to the data acquisition request, an aggregate dataset including the one or more fields and one or more additional security information fields, where the one or more additional security information fields represent security descriptors associated with each data object of the received aggregate dataset. The operations of 1410 may be performed according to the methods described herein. In some examples, aspects of the operations of 1410 may be performed by a dataset reception component as described with reference to FIGS. 7 through 9.

At 1415, the analytical data store may generate a multiple-value field representing the one or more additional security information fields of the aggregate dataset. The operations of 1415 may be performed according to the methods described herein. In some examples, aspects of the operations of 1415 may be performed by a multiple-value field component as described with reference to FIGS. 7 through 9.

At 1420, the analytical data store may embed the generated multiple-value field with the one or more fields in the aggregate dataset. The operations of 1420 may be performed according to the methods described herein. In some examples, aspects of the operations of 1420 may be performed by a multiple-value field component as described with reference to FIGS. 7 through 9.

At 1425, the analytical data store may receive, from a user device, a query for data associated with the aggregate dataset. This data may be part of the aggregate dataset, or may be part of a dataset (e.g., an analytics dataset) generated based on the aggregate dataset. The operations of 1425 may be performed according to the methods described herein. In some examples, aspects of the operations of 1425 may be performed by a query reception component as described with reference to FIGS. 7 through 9.

At 1430, the analytical data store may identify a subset of security descriptors applicable to a user ID or a group ID associated with the user device. The operations of 1430 may be performed according to the methods described herein. In some examples, aspects of the operations of 1430 may be performed by a security descriptor identifier as described with reference to FIGS. 7 through 9.

At 1435, the analytical data store may filter a subset of data associated with the aggregate dataset based on the identified subset of security descriptors and the multiple-value field corresponding to the one or more additional security information fields of the aggregate dataset. The operations of 1435 may be performed according to the methods described herein. In some examples, aspects of the operations of 1435 may be performed by a filtering component as described with reference to FIGS. 7 through 9.

At 1440, the analytical data store may transmit, to the user device, the filtered subset of data in response to the query for data. The operations of 1440 may be performed according to the methods described herein. In some examples, aspects of the operations of 1440 may be performed by a query response component as described with reference to FIGS. 7 through 9.

Figure 15:
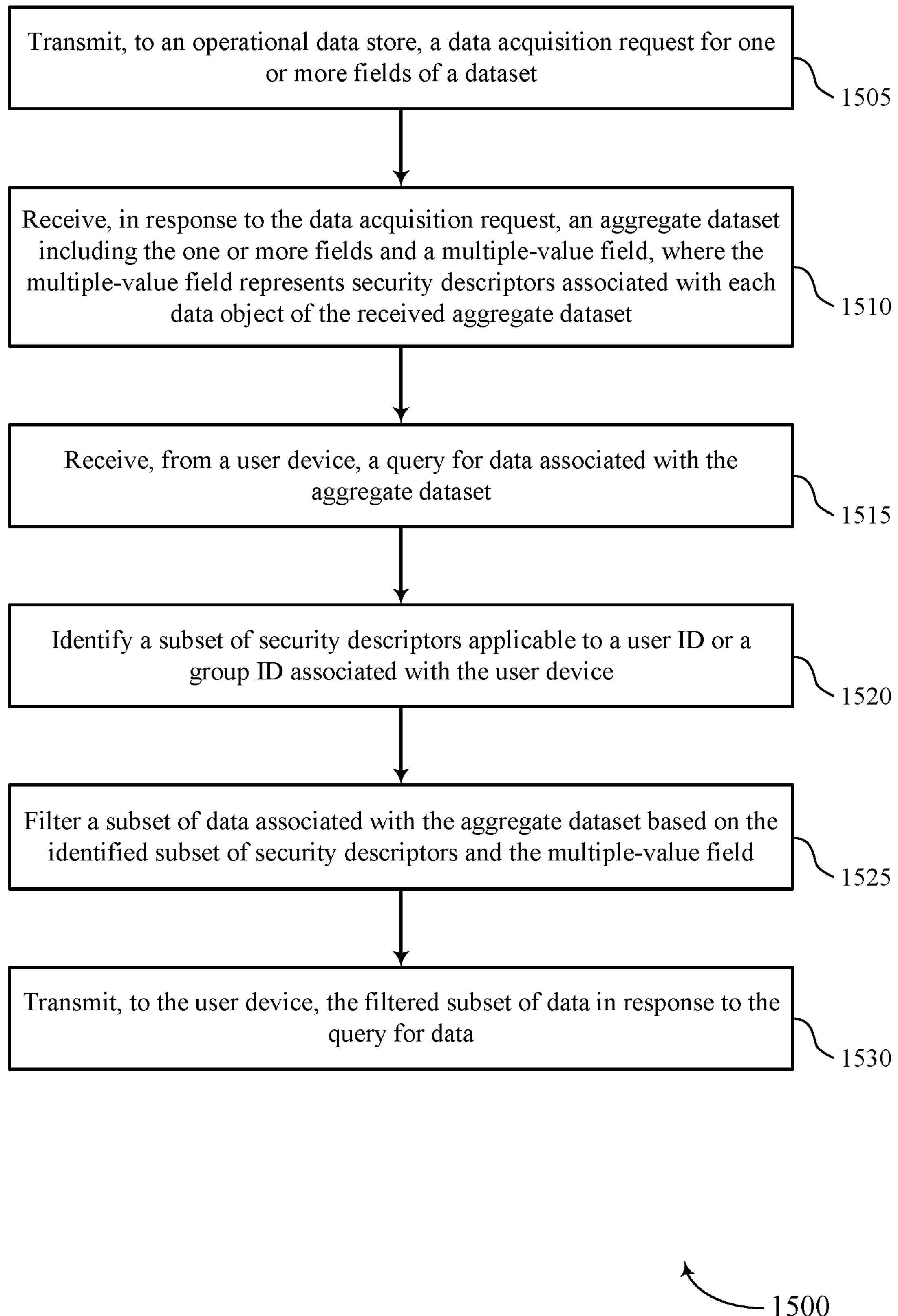

FIG. 15 shows a flowchart illustrating a method 1500 that supports providing matching security between data stores in a database system in accordance with aspects of the present disclosure. The operations of method 1500 may be implemented by an analytical data store or its components as described herein. For example, the operations of method 1500 may be performed by a security descriptor handling module as described with reference to FIGS. 7 through 9. In some examples, an analytical data store may execute a set of instructions to control the functional elements of the analytical data store to perform the functions described below. Additionally or alternatively, the analytical data store may perform aspects of the functions described below using special-purpose hardware.

At 1505, the analytical data store may transmit, to an operational data store, a data acquisition request for one or more fields of a dataset. The operations of 1505 may be performed according to the methods described herein. In some examples, aspects of the operations of 1505 may be performed by a data acquisition request component as described with reference to FIGS. 7 through 9.

At 1510, the analytical data store may receive, in response to the data acquisition request, an aggregate dataset including the one or more fields and one or more additional security information fields, where the one or more additional security information fields represent security descriptors associated with each data object of the received aggregate dataset. The one or more additional security fields may be a single multiple-value field representing the security information. The operations of 1510 may be performed according to the methods described herein. In some examples, aspects of the operations of 1510 may be performed by a dataset reception component as described with reference to FIGS. 7 through 9.

At 1515, the analytical data store may receive, from a user device, a query for data associated with the aggregate dataset. The operations of 1515 may be performed according to the methods described herein. In some examples, aspects of the operations of 1515 may be performed by a query reception component as described with reference to FIGS. 7 through 9.

At 1520, the analytical data store may identify a subset of security descriptors applicable to a user ID or a group ID associated with the user device. The operations of 1520 may be performed according to the methods described herein. In some examples, aspects of the operations of 1520 may be performed by a security descriptor identifier as described with reference to FIGS. 7 through 9.

At 1525, the analytical data store may filter a subset of data associated with the aggregate dataset based on the identified subset of security descriptors and the received multiple-value field corresponding to the one or more additional security information fields of the aggregate dataset. The operations of 1525 may be performed according to the methods described herein. In some examples, aspects of the operations of 1525 may be performed by a filtering component as described with reference to FIGS. 7 through 9.

At 1530, the analytical data store may transmit, to the user device, the filtered subset of data in response to the query for data. The operations of 1530 may be performed according to the methods described herein. In some examples, aspects of the operations of 1530 may be performed by a query response component as described with reference to FIGS. 7 through 9.

Figure 16:
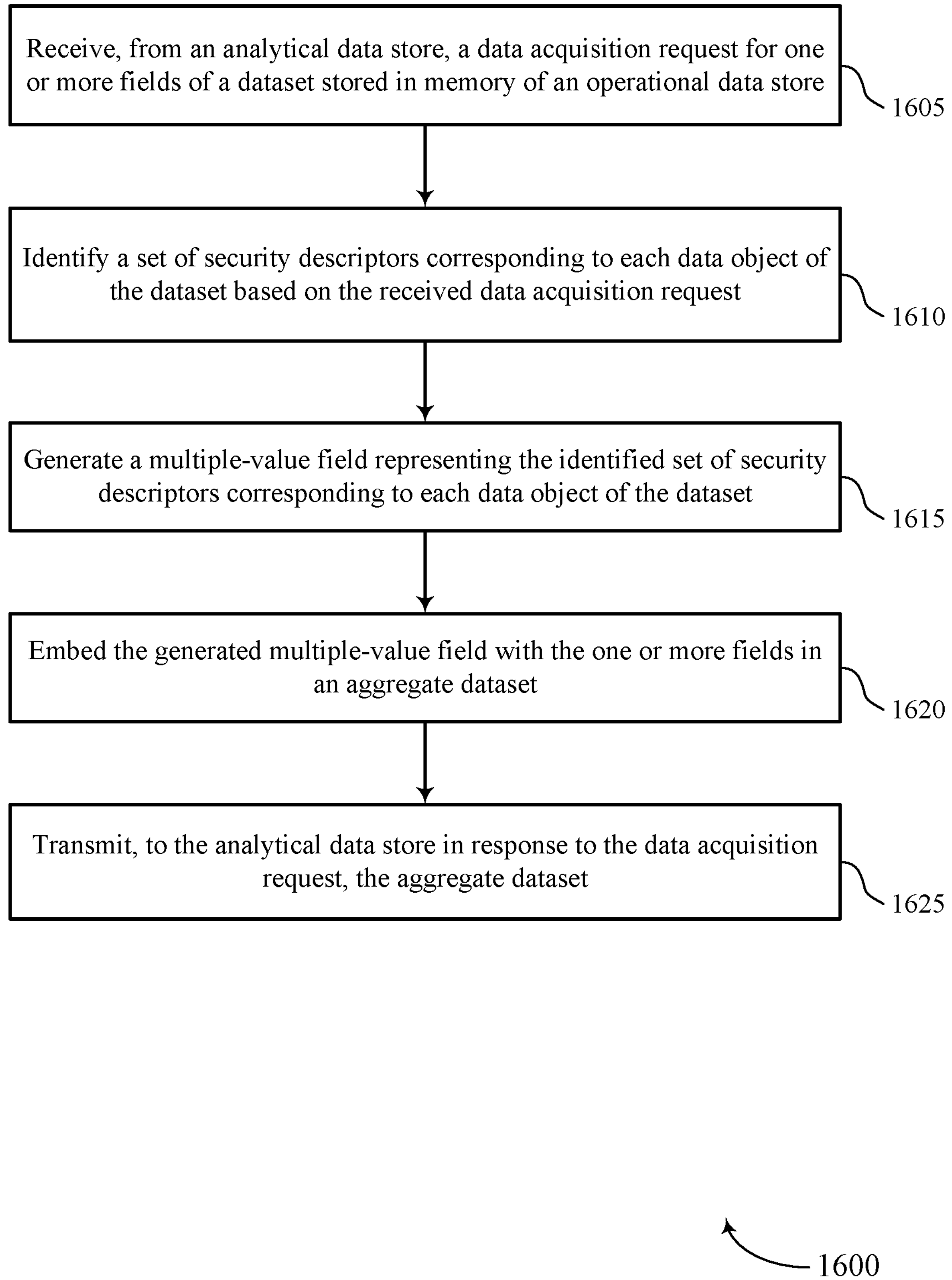

FIG. 16 shows a flowchart illustrating a method 1600 that supports providing matching security between data stores in a database system in accordance with aspects of the present disclosure. The operations of method 1600 may be implemented by an operational data store or its components as described herein. For example, the operations of method 1600 may be performed by a security descriptor handling module as described with reference to FIGS. 10 through 12. In some examples, an operational data store may execute a set of instructions to control the functional elements of the operational data store to perform the functions described below. Additionally or alternatively, the operational data store may perform aspects of the functions described below using special-purpose hardware.

At 1605, the operational data store may receive, from an analytical data store, a data acquisition request for one or more fields of a dataset stored in memory of the operational data store. The operations of 1605 may be performed according to the methods described herein. In some examples, aspects of the operations of 1605 may be performed by a data acquisition request component as described with reference to FIGS. 10 through 12.

At 1610, the operational data store may identify a set of security descriptors corresponding to each data object of the dataset based on the received data acquisition request. The operations of 1610 may be performed according to the methods described herein. In some examples, aspects of the operations of 1610 may be performed by a security descriptor identifier as described with reference to FIGS. 10 through 12.

At 1615, the operational data store may generate a multiple-value field representing the identified set of security descriptors corresponding to the each data object of the dataset. The operations of 1615 may be performed according to the methods described herein. In some examples, aspects of the operations of 1615 may be performed by a multiple-value field component as described with reference to FIGS. 10 through 12.

At 1620, the operational data store may embed the generated multiple-value field with the one or more fields in an aggregate dataset. The operations of 1620 may be performed according to the methods described herein. In some examples, aspects of the operations of 1620 may be performed by an embedding component as described with reference to FIGS. 10 through 12.

At 1625, the operational data store may transmit, to the analytical data store in response to the data acquisition request, the aggregate dataset. The operations of 1625 may be performed according to the methods described herein. In some examples, aspects of the operations of 1625 may be performed by a data acquisition response component as described with reference to FIGS. 10 through 12.

A method, at an analytical data store of a database system, for providing security descriptors from an operational data store to the analytical data store of the database system is described. The method may include transmitting, to the operational data store, a data acquisition request for one or more fields of a dataset, and receiving, in response to the data acquisition request, an aggregate dataset including the one or more fields and one or more additional security information fields, where the one or more additional security information fields represent security descriptors associated with each data object of the received aggregate dataset. The method may further include receiving, from a user device, a query for data associated with the aggregate dataset, identifying a subset of security descriptors applicable to a user ID or a group ID associated with the user device, filtering a subset of data associated with the aggregate dataset based on the identified subset of security descriptors and a multiple-value field corresponding to the one or more additional security information fields of the aggregate dataset, and transmitting, to the user device, the filtered subset of data in response to the query for data.

An apparatus, at an analytical data store of a database system, for providing security descriptors from an operational data store to the analytical data store of the database system is described. The apparatus may include a processor, memory in electronic communication with the processor, and instructions stored in the memory. The instructions may be executable by the processor to cause the apparatus to transmit, to the operational data store, a data acquisition request for one or more fields of a dataset, and receive, in response to the data acquisition request, an aggregate dataset including the one or more fields and one or more additional security information fields, where the one or more additional security information fields represent security descriptors associated with each data object of the received aggregate dataset. The instructions may be further executable by the processor to cause the apparatus to receive, from a user device, a query for data associated with the aggregate dataset, identify a subset of security descriptors applicable to a user ID or a group ID associated with the user device, filter a subset of data associated with the aggregate dataset based on the identified subset of security descriptors and a multiple-value field corresponding to the one or more additional security information fields of the aggregate dataset, and transmit, to the user device, the filtered subset of data in response to the query for data.

Another apparatus, at an analytical data store of a database system, for providing security descriptors from an operational data store to the analytical data store of the database system is described. The apparatus may include means for transmitting, to the operational data store, a data acquisition request for one or more fields of a dataset, and means for receiving, in response to the data acquisition request, an aggregate dataset including the one or more fields and one or more additional security information fields, where the one or more additional security information fields represent security descriptors associated with each data object of the received aggregate dataset. The apparatus may further include means for receiving, from a user device, a query for data associated with the aggregate dataset, identifying a subset of security descriptors applicable to a user ID or a group ID associated with the user device, filtering a subset of data associated with the aggregate dataset based on the identified subset of security descriptors and a multiple-value field corresponding to the one or more additional security information fields of the aggregate dataset, and transmitting, to the user device, the filtered subset of data in response to the query for data.

A non-transitory computer-readable medium storing code, at an analytical data store of a database system, for providing security descriptors from an operational data store to the analytical data store of the database system is described. The code may include instructions executable by a processor to transmit, to the operational data store, a data acquisition request for one or more fields of a dataset, and receive, in response to the data acquisition request, an aggregate dataset including the one or more fields and one or more additional security information fields, where the one or more additional security information fields represent security descriptors associated with each data object of the received aggregate dataset. The instructions may be further executable by the processor to receive, from a user device, a query for data associated with the aggregate dataset, identify a subset of security descriptors applicable to a user ID or a group ID associated with the user device, filter a subset of data associated with the aggregate dataset based on the identified subset of security descriptors and a multiple-value field corresponding to the one or more additional security information fields of the aggregate dataset, and transmit, to the user device, the filtered subset of data in response to the query for data.

Some examples of the method, apparatuses, and non-transitory computer-readable medium described herein may further include operations, features, means, or instructions for storing, in memory of the analytical data store, the aggregate dataset.

Some examples of the method, apparatuses, and non-transitory computer-readable medium described herein may further include operations, features, means, or instructions for generating the multiple-value field representing the one or more additional security information fields of the aggregate dataset and embedding the generated multiple-value field with the one or more fields in the aggregate dataset.

In some examples of the method, apparatuses, and non-transitory computer-readable medium described herein, the one or more additional security information fields of the received aggregate dataset include the multiple-value field.

Some examples of the method, apparatuses, and non-transitory computer-readable medium described herein may further include operations, features, means, or instructions for retrieving the subset of security descriptors corresponding to a user of the user device and the dataset and adding the retrieved subset of security descriptors to the query as security predicates.

Some examples of the method, apparatuses, and non-transitory computer-readable medium described herein may further include operations, features, means, or instructions for comparing the subset of security descriptors to values contained in the multiple-value field for each data object of the aggregate dataset, where the filtering may be performed at the data object level based on the comparing.

In some examples of the method, apparatuses, and non-transitory computer-readable medium described herein, the data acquisition request includes a data object type corresponding to the dataset, one or more field indicators corresponding to the one or more fields of the dataset, an indication of a periodicity for transmitting the data acquisition request, or a combination thereof. In some examples of the method, apparatuses, and non-transitory computer-readable medium described herein, the data acquisition request may be transmitted according to the indicated periodicity, a default periodicity, or a combination thereof.

Some examples of the method, apparatuses, and non-transitory computer-readable medium described herein may further include operations, features, means, or instructions for identifying a modification to a security parameter of at least one of the one or more fields of the dataset and triggering the transmission of the data acquisition request based on identifying the modification to the security parameter.

Some examples of the method, apparatuses, and non-transitory computer-readable medium described herein may further include operations, features, means, or instructions for determining one or more analytical datasets based on the aggregate dataset and a predictive function, an NLP procedure, a machine learning procedure, or a combination thereof, where each analytical dataset of the one or more analytical datasets inherits security information from the multiple-value field of the aggregate dataset.

Some examples of the method, apparatuses, and non-transitory computer-readable medium described herein may further include operations, features, means, or instructions for performing one or more pre-condition tests for the query based on a user of the user device, the aggregate dataset, or a combination thereof and processing the query based on a result of the one or more pre-condition tests. In some examples of the method, apparatuses, and non-transitory computer-readable medium described herein, the one or more pre-condition tests include identifying whether the aggregate dataset exists in memory of the analytical data store, identifying whether the user of the user device may have access to the aggregate dataset, identifying whether the aggregate dataset may be a public dataset, identifying whether the user of the user device may have a view all data permission, or identifying a combination thereof.

Some examples of the method, apparatuses, and non-transitory computer-readable medium described herein may further include operations, features, means, or instructions for tracking a time for query processing, where the query processing includes receiving the query, identifying the subset of security descriptors, filtering the subset of data associated with the aggregate dataset, and transmitting the filtered subset of data. Some examples of the method, apparatuses, and non-transitory computer-readable medium described herein may further include operations, features, means, or instructions for halting the query processing if the time for the query processing exceeds a query response threshold time and transmitting, to the user device and in response to the query for data, an indication that the time for the query processing exceeded the query response threshold time.

Some examples of the method, apparatuses, and non-transitory computer-readable medium described herein may further include operations, features, means, or instructions for protecting the multiple-value field against extraction based on a tenant permission, a user permission, or a combination thereof. Some examples of the method, apparatuses, and non-transitory computer-readable medium described herein may further include operations, features, means, or instructions for generating an index for the multiple-value field of the aggregate dataset, where filtering the subset of data for the query may be based on the generated index.

A method, at an operational data store of a database system, for providing security descriptors from the operational data store to an analytical data store of the database system is described. The method may include receiving, from the analytical data store, a data acquisition request for one or more fields of a dataset stored in memory of the operational data store, identifying a set of security descriptors corresponding to each data object of the dataset based on the received data acquisition request, generating a multiple-value field representing the identified set of security descriptors corresponding to the each data object of the dataset, embedding the generated multiple-value field with the one or more fields in an aggregate dataset, and transmitting, to the analytical data store in response to the data acquisition request, the aggregate dataset.

An apparatus, at an operational data store of a database system, for providing security descriptors from the operational data store to an analytical data store of the database system is described. The apparatus may include a processor, memory in electronic communication with the processor, and instructions stored in the memory. The instructions may be executable by the processor to cause the apparatus to receive, from the analytical data store, a data acquisition request for one or more fields of a dataset stored in memory of the operational data store, identify a set of security descriptors corresponding to each data object of the dataset based on the received data acquisition request, generate a multiple-value field representing the identified set of security descriptors corresponding to the each data object of the dataset, embed the generated multiple-value field with the one or more fields in an aggregate dataset, and transmit, to the analytical data store in response to the data acquisition request, the aggregate dataset.

Another apparatus, at an operational data store of a database system, for providing security descriptors from the operational data store to an analytical data store of the database system is described. The apparatus may include means for receiving, from the analytical data store, a data acquisition request for one or more fields of a dataset stored in memory of the operational data store, identifying a set of security descriptors corresponding to each data object of the dataset based on the received data acquisition request, generating a multiple-value field representing the identified set of security descriptors corresponding to the each data object of the dataset, embedding the generated multiple-value field with the one or more fields in an aggregate dataset, and transmitting, to the analytical data store in response to the data acquisition request, the aggregate dataset.

A non-transitory computer-readable medium storing code, at an operational data store of a database system, for providing security descriptors from the operational data store to an analytical data store of the database system is described. The code may include instructions executable by a processor to receive, from the analytical data store, a data acquisition request for one or more fields of a dataset stored in memory of the operational data store, identify a set of security descriptors corresponding to each data object of the dataset based on the received data acquisition request, generate a multiple-value field representing the identified set of security descriptors corresponding to the each data object of the dataset, embed the generated multiple-value field with the one or more fields in an aggregate dataset, and transmit, to the analytical data store in response to the data acquisition request, the aggregate dataset.

Some examples of the method, apparatuses, and non-transitory computer-readable medium described herein may further include operations, features, means, or instructions for converting the one or more fields in the aggregate dataset into fields supported by the analytical data store, where the converting may be part of a bulk extraction process for the dataset.

Some examples of the method, apparatuses, and non-transitory computer-readable medium described herein may further include operations, features, means, or instructions for receiving, from the analytical data store, an indication of a query received at the analytical data store from a user device and transmitting, to the analytical data store in response to the indication of the query, a subset of security descriptors applicable to a ID or a group ID associated with the user device.

Some examples of the method, apparatuses, and non-transitory computer-readable medium described herein may further include operations, features, means, or instructions for identifying modifications to security parameters of at least one of the one or more fields of the dataset and periodically transmitting, to the analytical data store, a visibility change notification based on identifying the modifications to the security parameters, where the data acquisition request may be received based on the visibility change notification.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, at an analytical data store of a database system, for providing security descriptors from an operational data store to the analytical data store of the database system, comprising:

transmitting, from the analytical data store and to the operational data store, a data acquisition request for one or more fields of a first dataset, wherein the first dataset comprises a plurality of data objects storing respective values for fields of the one or more fields;

receiving, at the analytical data store and from the operational data store in response to the data acquisition request, an aggregate dataset comprising the one or more fields for data objects of the first dataset requested by the data acquisition request and an embedded multiple-value field corresponding to the data objects, the embedded multiple-value field representing the security descriptors retrieved from the operational data store and associated with the data objects;

receiving, at the analytical data store and from a user device, a query for data associated with the aggregate dataset;

identifying a subset of security descriptors applicable to a user identifier (ID) or a group ID associated with the user device originating the query;

comparing the identified subset of security descriptors applicable to the user ID or the group ID to the embedded multiple-value field representing the security descriptors;

filtering a subset of data associated with the aggregate dataset based at least in part on the comparing; and transmitting, to the user device, the filtered subset of data in response to the query.

2. The method of claim 1, further comprising:

storing, in memory of the analytical data store, the aggregate dataset.

3. The method of claim 1, further comprising:

retrieving the identified subset of security descriptors corresponding to a user of the user device originating the query and the first dataset; and adding the retrieved subset of security descriptors to the query as security predicates.

4. The method of claim 1, wherein the comparing comprises:

comparing the identified subset of security descriptors to values contained in the embedded multiple-value field for each data object of the aggregate dataset, wherein the filtering is performed at the data object level.

5. The method of claim 1, wherein the data acquisition request comprises a data object type corresponding to the first dataset, one or more field indicators corresponding to the one or more fields of the first dataset, an indication of a periodicity for transmitting the data acquisition request, or a combination thereof.

6. The method of claim 5, wherein the data acquisition request is transmitted according to the indicated periodicity, a default periodicity, or a combination thereof.

7. The method of claim 1, further comprising:

identifying a modification to a security parameter of at least one of the one or more fields of the first dataset; and triggering the transmission of the data acquisition request based at least in part on identifying the modification to the security parameter.

8. The method of claim 1, further comprising:

determining one or more analytical datasets based at least in part on the aggregate dataset and a predictive function, a natural language processing (NLP) procedure, a machine learning procedure, or a combination thereof, wherein each analytical dataset of the one or more analytical datasets inherits security information from the embedded multiple-value field of the aggregate dataset.

9. The method of claim 1, further comprising:

performing one or more pre-condition tests for the query based at least in part on a user of the user device, the aggregate dataset, or a combination thereof; and processing the query based at least in part on a result of the one or more pre-condition tests.

10. The method of claim 9, wherein the one or more pre-condition tests comprise identifying whether the aggregate dataset exists in memory of the analytical data store, identifying whether the user of the user device has access to the aggregate dataset, identifying whether the aggregate dataset is a public dataset, identifying whether the user of the user device has a view all data permission, or identifying a combination thereof.

11. The method of claim 1, further comprising:

tracking a time for query processing, wherein the query processing comprises receiving the query, identifying the subset of security descriptors, comparing the identified subset of security descriptors to the embedded multiple-value field, filtering the subset of data associated with the aggregate dataset, and transmitting the filtered subset of data;

halting the query processing if the time for the query processing exceeds a query response threshold time; and transmitting, to the user device and in response to the query for data, an indication that the time for the query processing exceeded the query response threshold time.

12. The method of claim 1, further comprising:

protecting the embedded multiple-value field against extraction based at least in part on a tenant permission, a user permission, or a combination thereof.

13. The method of claim 1, further comprising:

generating an index for the embedded multiple-value field of the aggregate dataset, wherein filtering the subset of data is based at least in part on the generated index.

14. An apparatus, at an analytical data store of a database system, for providing security descriptors from an operational data store to the analytical data store of the database system, comprising:

a processor, memory in electronic communication with the processor; and instructions stored in the memory and executable by the processor to cause the apparatus to:

transmit, from the analytical data store and to the operational data store, a data acquisition request for one or more fields of a first dataset, wherein the first dataset comprises a plurality of data objects storing respective values for fields of the one or more fields;

receive, at the analytical data store and from the operational data store in response to the data acquisition request, an aggregate dataset comprising the one or more fields for data objects of the first dataset requested by the data acquisition request and an embedded multiple-value field corresponding to the data objects, the embedded multiple-value field representing the security descriptors retrieved from the operational data store and associated with the data objects;

receive, at the analytical data store and from a user device, a query for data associated with the aggregate dataset;

identify a subset of security descriptors applicable to a user identifier (ID) or a group ID associated with the user device originating the query;

compare the identified subset of security descriptors applicable to the user ID or the group ID to the embedded multiple-value field representing the security descriptors;

filter a subset of data associated with the aggregate dataset based at least in part on the comparing; and transmit, to the user device, the filtered subset of data in response to the query.

* * * * *